(12) United States Patent
Song

(10) Patent No.: US 12,282,750 B2
(45) Date of Patent: *Apr. 22, 2025

(54) PROCESSING-IN-MEMORY DEVICES HAVING MULTIPLE OPERATION CIRCUITS

(71) Applicant: SK hynix Inc., Icheon-si Gyeonggi-do (KR)

(72) Inventor: Choung Ki Song, Icheon-si Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 864 days.

This patent is subject to a terminal disclaimer.

(21) Appl. No.: 17/498,222

(22) Filed: Oct. 11, 2021

(65) Prior Publication Data

US 2022/0342639 A1 Oct. 27, 2022

Related U.S. Application Data

(63) Continuation of application No. 17/399,844, filed on Aug. 11, 2021.

(30) Foreign Application Priority Data

Apr. 21, 2021 (KR) .................. 10-2021-0052016

(51) Int. Cl.
*G06F 7/544* (2006.01)
*G06F 5/01* (2006.01)
*G06F 7/499* (2006.01)
*G06F 7/50* (2006.01)
*G06F 7/523* (2006.01)
(Continued)

(52) U.S. Cl.
CPC ............ *G06F 7/5443* (2013.01); *G06F 5/012* (2013.01); *G06F 7/499* (2013.01); *G06F 7/50* (2013.01); *G06F 7/523* (2013.01); *G06F 17/16* (2013.01); *G06F 7/57* (2013.01)

(58) Field of Classification Search
None
See application file for complete search history.

(56) References Cited

U.S. PATENT DOCUMENTS

| | | | |
|---|---|---|---|
| 10,831,445 B1 * | 11/2020 | Clark | G06F 7/5235 |
| 2020/0150598 A1 * | 5/2020 | Kim | G05B 13/027 |
| 2021/0042087 A1 * | 2/2021 | Pugh | G06F 7/4876 |

(Continued)

FOREIGN PATENT DOCUMENTS

| | | |
|---|---|---|
| KR | 1020180062910 A | 6/2018 |
| KR | 1020190119076 A | 10/2019 |

*Primary Examiner* — Tan V Mai
(74) *Attorney, Agent, or Firm* — WILLIAM PARK & ASSOCIATES LTD.

(57) ABSTRACT

A processing-in-memory (PIM) device may include a plurality of memory banks configured to provide plural groups of weight data, a global buffer configured to provide plural sets of vector data, and a plurality of multiplication/accumulation (MAC) operators configured to perform MAC operations of the plural groups of weigh data and the plural sets of vector data. Each of the plurality of MAC operators includes a plurality of multiple operation circuits. Each of the plurality of multiple operation circuits is configured to perform an arithmetic operation in a first operation mode, a second operation mode, or a third operation mode according to first to third selection signals.

11 Claims, 22 Drawing Sheets

(51) Int. Cl.
*G06F 17/16* (2006.01)
*G06F 7/57* (2006.01)

(56) References Cited

U.S. PATENT DOCUMENTS

| | | | |
|---|---|---|---|
| 2021/0089889 A1* | 3/2021 | Gope | G06N 3/045 |
| 2021/0303358 A1* | 9/2021 | Zaidy | G06F 9/5027 |
| 2022/0066760 A1* | 3/2022 | Chang | G06N 3/063 |
| 2022/0164164 A1* | 5/2022 | Kwon | G06F 7/50 |
| 2022/0350569 A1* | 11/2022 | Zhang | G06N 3/063 |

* cited by examiner

FIG.5

$W(1,1) \times V(1) + W(1,2) \times V(2) + W(1,3) \times V(3) + \ldots + W(1,N) \times V(N) = MAC\_RST(1)$ MAC1[15:0] ← 1st MAC OPERATION MAC2[15:0] ← 2nd MAC OPERATION MAC3[15:0] ← 3rd MAC OPERATION

⋮

MAC"N"[15:0] = MAC_RST(1) ← "N"th MAC OPERATION

PROCESSING-IN-MEMORY DEVICES HAVING MULTIPLE OPERATION CIRCUITS

CROSS-REFERENCE TO RELATED APPLICATIONS

This is a continuation application of U.S. patent application Ser. No. 17/399,844, filed on Aug. 11, 2021, which claims the priority of Korean Application No. 10-2021-0052016, filed on Apr. 21, 2021, which are incorporated herein by reference in their entirety.

BACKGROUND

1. Technical Field

Various embodiments of the present teachings relate to processing-in-memory (PIM) devices having multiple operation circuits.

2. Related Art

Recently, interest in artificial intelligence (AI) has been increasing not only in the information technology industry but also in the financial and medical industries. Accordingly, in various fields, the artificial intelligence, more precisely, the introduction of deep learning is considered and prototyped. In general, techniques for effectively learning deep neural networks (DNNs) or deep networks having the increased layers as compared with general neural networks to utilize the deep neural networks (DNNs) or the deep networks in pattern recognition or inference are commonly referred to as the deep learning.

One of backgrounds or causes of this widespread interest may be due to the improved performance of a processor performing arithmetic operations. To improve the performance of the artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including a memory and a processor which are separated from each other, the performance of the artificial intelligence may be degraded due to limitation of the amount of data communication between the memory and the processor. In order to solve this problem, a PIM device in which a processor and a memory are integrated in one semiconductor chip has been used as a neural network computing device. Because the PIM device directly performs arithmetic operations in the PIM device, a data processing speed in the neural network may be improved,

SUMMARY

According to an embodiment, a processing-in-memory (PIM) device may include a plurality of memory banks configured to provide plural groups of weight data, a global buffer configured to provide plural sets of vector data, and a plurality of multiplication/accumulation (MAC) operators configured to perform MAC operations of the plural groups of weigh data and the plural sets of vector data. Each of the plurality of MAC operators includes a plurality of multiple operation circuits. Each of the plurality of multiple operation circuits is configured to perform an arithmetic operation in a first operation mode, a second operation mode, or a third operation mode according to first to third selection signals.

According to still another embodiment, a processing-in-memory (PIM) device may include a plurality of memory banks configured to provide plural groups of weight data, a global buffer configured to provide plural sets of vector data, and a plurality of multiple operation circuits configured to perform MAC operations of the plural groups of weigh data and the plural sets of vector data. Each of the plurality of multiple operation circuits is configured to perform an arithmetic operation in a first operation mode, a second operation mode, or a third operation mode according to first to third selection signals.

BRIEF DESCRIPTION OF THE DRAWINGS

Certain features of the disclosed technology are illustrated by various embodiments with reference to the attached drawings, in which:

FIG. 5 illustrates an example of a process of the matrix-vector multiplying calculation illustrated in FIG. 4;

DETAILED DESCRIPTION

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative position& relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other dement indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Various embodiments are directed to PIM devices including the multiple operation circuits.

Figure 1:
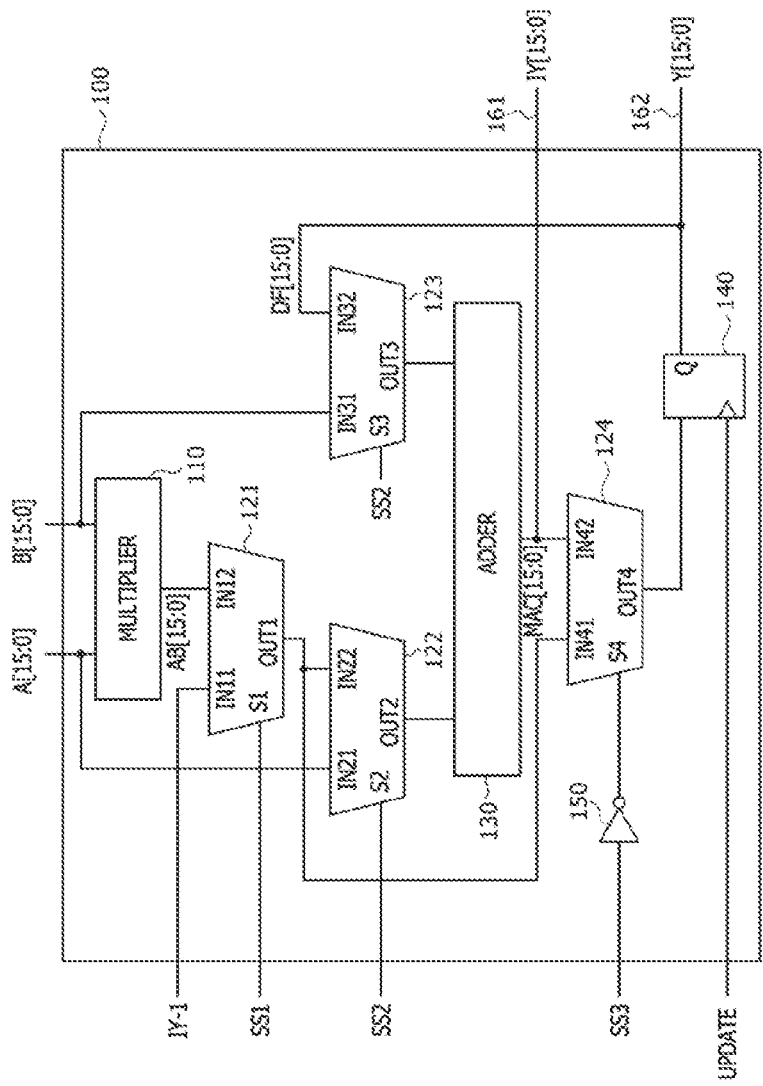
FIG. 1 illustrates a configuration of a multiple operation circuit according to an embodiment of the present disclosure.

FIG. 1 illustrates a configuration of a multiple operation circuit 100 according to an embodiment of the present disclosure, Referring to FIG. 1, the multiple operation circuit 100 may receive first input data A[15:0] and second input data B[15:0]. Hereinafter, it may be assumed that the first input data A[15:0] correspond to a 16-bit binary stream and the second input data B[15:0] also correspond to a 16-bit binary stream. However, the embodiment that the first input data A[15:0] are a 16-bit binary stream and the second input data B[15:0] are a 16-bit binary stream is merely an example of the present disclosure. Accordingly, in some other embodiments, the number of bits included in the first input data or the second input data may be less than or greater than sixteen. In an embodiment, the first input data A[15:0] may be transmitted from a first memory bank to the multiple operation circuit 100, and the second input data B[15:0] may be transmitted from a second memory bank to the multiple operation circuit 100. Alternatively, the first input data A[15:0] may be transmitted from a memory bank to the multiple operation circuit 100, and the second input data B[15:0] may be transmitted from a buffer memory to the multiple operation circuit 100. The multiple operation circuit 100 may receive first result data IY-1 from another multiple operation circuit (not shown). The multiple operation circuit 100 may receive first to third selection signals SS1~SS3 and an update signal UPDATE as control signals. The multiple operation circuit 100 may output a second result data IY[15:0] and operation result data Y[15:0]. As used herein, the tilde "~" indicates a range of components. For example, "SS1~SS3" indicates the first to third selection signals SS1, SS2, and SS3 shown in FIG. 1.

The multiple operation circuit 100 may perform various arithmetic operations in a plurality of operation modes. The plurality of operation modes may include a first operation mode in which a MAC operation is performed, a second operation mode in which element-wise (EW) operations are performed, and a third operation mode in which an accumulating calculation (also, referred to as "accumulative adding calculation") is performed. The EW operations performed in the second operation mode may include an EW multiplying calculation and an EW adding calculation. In an embodiment, the MAC operation may be performed by a matrix-vector multiplying calculation of first matrix data and second matrix data. The EW multiplying calculation may be executed by multiplying the first matrix data by a matrix scalar having a constant value. The EW adding calculation may be executed by an element-to-element adding calculation of the first matrix data and the second matrix data. In addition, the accumulating calculation may be executed by an adding calculation of the first result data IY-1 and the second result data IY[15:0]. In an embodiment, the first, second, third, and fourth selectors 121 to 124 may change the signal transmission paths of the first result data IY-1, the first and second input data A[15:0] and B[15:0], the multiplication result data AB[15:0], the addition result data DA11 [15:0], and MAC data MAC[15:0] based on the first to third selection signals SS1 to SS3 according to the first, second, or third operation modes. For example, the signal transmission paths for the first result data IY-1 or multiplication result data AB[15:0] may be changed or decided on depending on which signal is chosen to be output from the output terminal OUT1 of the first selector 121 based on the first selection signal SS1.]

When the multiple operation circuit 100 performs the MAC operation in the first operation mode, the first matrix data (i.e., the first input data A[15:0]) and the second matrix data (i.e., the second input data B[15:0]) may be input to the multiple operation circuit 100. When the MAC operation is performed for an 'M×N' first matrix and an 'N×1' second matrix, the first input data A[15:0] may correspond to elements of the first matrix, and the second input data B[15:0] correspond to elements of the second matrix. The first input data A[15:0] may have a floating-point format which is comprised of a sign part, an exponent part, and a mantissa part, and the second input data B[15:0] may also have a floating-point format which is comprised of a sign part, an exponent part, and a mantissa part. However, the embodiment in which the first and second input data A[15:0] and B[15:0] have a floating-point format may be merely an example of the present disclosure. Accordingly, in some other embodiments, the first and second input data A[15:0] and B[15:0] may have a fixed-point format which is comprised of an integer part including a sign datum and a fractional part.

When the multiple operation circuit 100 performs the EW multiplying calculation in the second operation mode, matrix data corresponding to the first input data A[15:0] and a constant value corresponding to the second input data B[15:0] may be input to the multiple operation circuit 100. When the EW multiplying calculation is performed using the 'M×N' first matrix and a constant value as input data, the first input data A[15:0] may correspond to elements of the first matrix and the second input data B[15:0] may correspond to a constant value. When the multiple operation circuit 100 performs the EW adding calculation, the first matrix data corresponding to the first input data A[15:0] and the second matrix data corresponding to the second input data B[15:0] may be input to the multiple operation circuit 100. When the EW adding calculation is performed using an 'M×N' first matrix and an 'M×N' second matrix as input data, the first input data A[15:0] may correspond to elements of the 'M×N' first matrix and the second input data B[15:0] may correspond to elements of the 'M×N' second matrix. In such a case, an element "a" in the 'M×N' first matrix may be added to an element "b" which is located at the same position in the 'M×N' second matrix as the element "a".

When the multiple operation circuit 100 performs the accumulating calculation in the third operation mode, the multiple operation circuit 100 may receive the first result data IY-1. In an embodiment, the first result data IY-1 may be first multiplication result data which are transmitted from another multiple operation circuit (not shown) to the multiple operation circuit 100. The multiple operation circuit 100 may perform the accumulating calculation of the first multiplication result data and second multiplication result data stored in the multiple operation circuit 100 by a previous operation, thereby generating and outputting the second result data IY[15:0]. The second result data IY[15:0] output from the multiple operation circuit 100 may be transmitted to yet another multiple operation circuit (not shown) and may be used as the first result data IY-1 of the yet another multiple operation circuit.

The multiple operation circuit 100 may include a multiplier 110, first to fourth selectors 121~124, an adder 130, and a latch circuit 140.

The multiplier 110 may have a first input terminal, a second input terminal, and an output terminal. The first input data A[15:0] corresponding to the first matrix data and the second input data B[15:0] corresponding to the second matrix data may be input to the first input terminal and the second input terminal of the multiplier 110. The multiplier 110 may perform a multiplying calculation of the first input data A[15:0] and the second input data B[15:0] to generate multiplication result data AB[15:0], The multiplier 110 may output the multiplication result data AB[15:0] through the output terminal thereof. The first input terminal of the multiplier 110 may be coupled to a first input terminal IN21 of the second selector 122. Thus, the first input data A[15:0] transmitted to the first input terminal of the multiplier 110 may also be transmitted to the first input terminal IN21 of the second selector 122. The second input terminal of the multiplier 110 may be coupled to a first input terminal IN31 of the third selector 123. Thus, the second input data B[15:0] transmitted to the second input terminal of the multiplier 110 may also be transmitted to the first input terminal IN31 of the third selector 123. The output terminal of the multiplier 110 may be coupled to a second input terminal IN12 of the first selector 121. Thus, the multiplication result data AB[15:0] output from the multiplier 110 through the output terminal of the multiplier 110 may be transmitted to the second input terminal IN12 of the first selector 121.

The first selector 121 may have a first input terminal IN11, the second input terminal IN12, a selection terminal S1, and an output terminal OUT1. The first selector 121 may receive the first result data IY-1 through the first input terminal IN11. Because the second input terminal IN12 of the first selector 121 is coupled to the output terminal of the multiplier 110, the first selector 121 may receive the multiplication result data AB[15:0] from the multiplier 110 through the second input terminal IN12. The first selector 121 may also receive the first selection signal SS1 through the selection terminal S1 thereof. The output terminal OUT1 of the first selector 121 may be coupled to both of a second input terminal IN22 of the second selector 122 and a first input terminal IN41 of the fourth selector 124. The first selector 121 may output the first result data IY-1, which are input through the first input terminal IN11, through the output terminal OUT1 in response to the first selection signal SS1 having a first logic level. The first selector 121 may output the multiplication result data AB[15:0], which are input through the second input terminal IN12, through the output terminal OUT1 in response to the first selection signal SS1 having a second logic level. Hereinafter, t may be assumed that the first logic level is a logic "low" level and the second logic level is a logic "high" level. In an embodiment, the first selector 121 may be realized using a 2-to-1 multiplexer having two input terminals and one output terminal.

The second selector 122 may have the first input terminal IN21, the second input terminal IN22, a selection terminal S2, and an output terminal OUT2. Because the first input terminal IN21 of the second selector 122 is coupled to the first input terminal of the multiplier 110, the first input data A[15:0] may also be transmitted to the first input terminal IN21 of the second selector 122. The second selection signal SS2 may be input to the selection terminal S2 of the second selector 122. The output terminal OUT2 of the second selector 122 may be coupled to a first input terminal of the adder 130. The second selector 122 may output the first input data A[15:0], which are input through the first input terminal IN21, through the output terminal OUT2 in response to the second selection signal SS2 having a logic "'low" level. The second selector 122 may output the output data of the first selector 121, which are input through the second input terminal IN22, through the output terminal OUT2 in response to the second selection signal SS2 having a logic "high" level. In an embodiment, the second selector 122 may be realized using a 2-to-1 multiplexer having two input terminals and one output terminal. In an embodiment, the output data of the second selector 122 may be third input data received by the adder 130.

The third selector 123 may have the first input terminal IN31, a second input terminal IN32, a selection terminal S3, and an output terminal OUT3. Because the first input terminal IN31 of the third selector 123 is coupled to the second input terminal of the multiplier 110, the second input data B[15:0] may also be transmitted to the first input terminal IN31 of the third selector 123. The second input terminal IN32 of the third selector 123 may be coupled to an output terminal of the latch circuit 140. Thus, the third selector 123 may receive feedback data DF[15:0] corresponding to the operation result data Y[15:0] which are output from the latch circuit 140 through the output terminal of the latch circuit 140. The second selection signal SS2 may also be transmitted to the selection terminal S3 of the third selector 123. The output terminal OUT3 of the third selector 123 may be coupled to the second input terminal of the adder 130. The third selector 123 may output the second input data B[15:0], which are input through the first input terminal IN31, through the output terminal OUT3 in response to the second selection signal SS2 having a logic "low" level. The third selector 123 may output the feedback data DF[15:0], which are input through the second input terminal IN32, through the output terminal OUT3 in response to the second selection signal SS2 having a logic "high" level. In an embodiment, the third selector 123 may be realized using a 2-to-1 multiplexer having two input terminals and one output terminal. In an embodiment, output data output from the output terminal OUT3 of the third selector 123 may be fourth input data received by the adder 130.

The adder 130 may have a first input terminal, a second input terminal, and an output terminal. The first input terminal of the adder 130 may be coupled to the output terminal OUT2 of the second selector 122. The second input terminal of the adder 130 may be coupled to the output terminal OUT3 of the third selector 123. Thus, output data of the second selector 122 may be input to the first input terminal of the adder 130, and output data of the third selector 123 may be input to the second input terminal of the adder 130. When the second selection signal SS2 has a logic "low" level, the first input data A[15:0] and the second input data B[15:0] may be transmitted to respective ones of the first input terminal and the second input terminal of the adder 130. When the second selection signal SS2 has a logic "high" level, the output data of the first selector 121 and the feedback data DF[15:0] output from the latch circuit 140 may be transmitted to respective ones of the first input terminal and the second input terminal of the adder 130. The output terminal of the adder 130 may be coupled to both of a second input terminal IN42 of the fourth selector 124 and a first output line 161. The adder 130 may perform an adding calculation of two sets of data, which are input through the first and second input terminals of the adder 130, to generate MAC data MAC[15:0]. The adder 130 may transmit the MAC data MAC[15:0] to the second input terminal IN42 of the fourth selector 124 and may also output the MAC data MAC[15:0] as the second result data IY[15:0] (also, referred to as 'interim result data') corresponding to output data of the multiple operation circuit 100 through the first output line 161.

The fourth selector 124 may have the first input terminal IN41, the second input terminal IN42, a selection terminal S4, and an output terminal OUT4. The selection terminal S4 of the fourth selector 124 may be coupled to an output terminal of an inverter 150. The third selection signal SS3 may be transmitted to an input terminal of the inverter 150. In the present embodiment, the inverter 150 may be employed to more readily distinguish logic levels of the second and third selection signals SS2 and SS3 from each other. Thus, in some other embodiments, the multiple operation circuit 100 may be realized without the inverter 150. The output terminal OUT4 of the fourth selector 124 may be coupled to an input terminal of the latch circuit 140. The fourth selector 124 may output the output data of the first selector 121, which are input through the first input terminal IN41, through the output terminal OUT4 in response to the third selection signal SS3 having a logic "high" level. The fourth selector 124 may output the MAC data MAC[15:0], which are input through the second input terminal IN42, through the output terminal OUT4 in response to the third selection signal SS3 having a logic "low" level. In an embodiment, the fourth selector 124 may be realized using a 2-to-1 multiplexer having two input terminals and one output terminal. In an embodiment, the output data output from the output terminal OUT4 of the fourth selector 124 may be fifth input data received by the latch circuit 140.

The latch circuit 140 may have the input terminal, a clock terminal, and an output terminal Q. In an embodiment, the latch circuit 140 may be realized using a flip-flop having a latch function. The input terminal of the latch circuit 140 may be coupled to the output terminal OUT4 of the fourth selector 124. The update signal UPDATE may be transmitted to the clock terminal of the latch circuit 140. The output terminal Q of the latch circuit 140 may be coupled to both of the second input terminal IN32 of the third selector 123 and a second output line 162. The latch circuit 140 may be synchronized with a rising edge of the update signal UPDATE to latch the output data of the fourth selector 124, which are input to the input terminal of the latch circuit 140. The latched data of the latch circuit 140 may be output through the output terminal Q at a point in time when a certain time elapses from the rising edge of the update signal UPDATE. The output data of the latch circuit 140 may correspond to the feedback data DF[15:0] which are transmitted to the second input terminal IN32 of the third selector 123. In addition, the output data of the latch circuit 140 may be output as the operation result data Y[15:0] corresponding to output data of the multiple operation circuit 100 through second output line 162.

Figure 2:
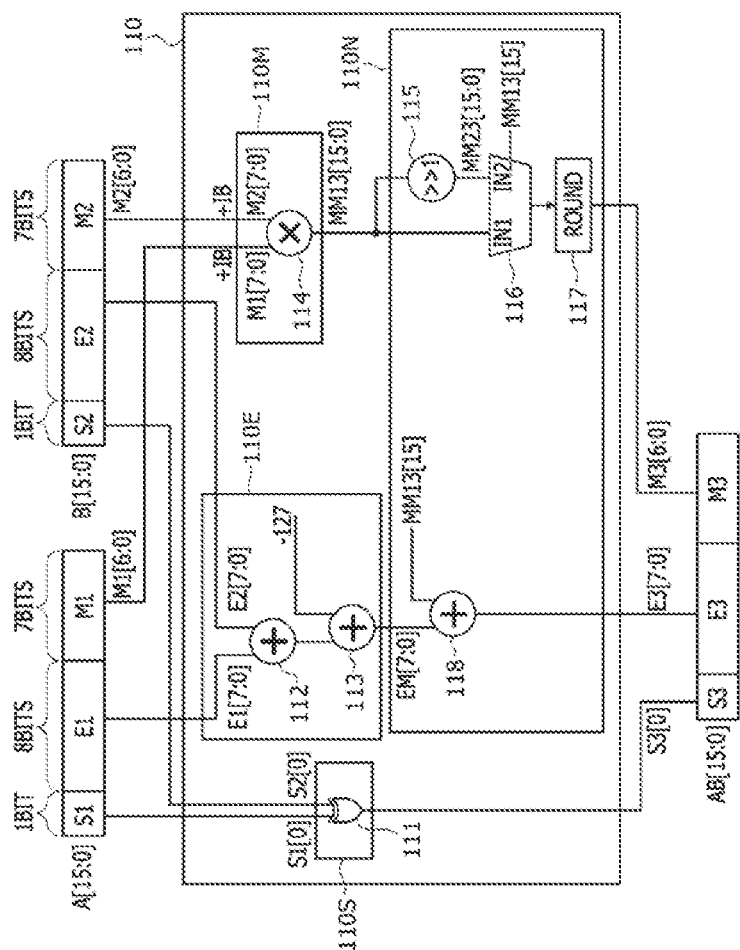
FIG. 2 illustrates an example of a configuration of a multiplier included in the multiple operation circuit illustrated in FIG. 1.

FIG. 2 illustrates an example of a configuration of the multiplier 110 included in the multiple operation circuit 100 illustrated in FIG. 1. In the present embodiment, it may be assumed that the first input data A[15:0] are comprised of a first sign datum S1[0] having one bit, first exponent data E1[7:0] having 8 bits, and first mantissa data M1[6:0] having 7 bits. In addition, it may be assumed that the second input data B[15:0] are comprised of a second sign datum S2[0] having one bit, second exponent data E2[7:0] having 8 bits, and second mantissa data M2[6:0] having 7 bits. Similarly, it may be assumed that the multiplication result data AB[15:0] output from the multiplier 110 are comprised of a third sign datum S3[0] having one bit, third exponent data E3[7:0] having 8 bits, and third mantissa data M3[6:0] having 7 bits.

Referring to FIG. 2, the multiplier 110 may include a sign processing circuit 110S, an exponent processing circuit 110E, a mantissa processing circuit 110M, and a normalizer 110N. The sign processing circuit 110S may include an exclusive OR (XOR) gate 111. The XOR gate 111 may perform an XOR operation using the first sign datum S1[0] of the first input data A[15:0] and the second sign datum S2[0] of the second input data B[15:0] as input data. The XOR gate 111 may output the third sign datum S3[0] of the multiplication result data.

The exponent processing circuit 110E may include a first exponent adder 112 and a second exponent adder 113. The first exponent adder 112 may perform an adding calculation of the first exponent data E1[7:0] of the first input data A[15:0] and the second exponent data E2[7:0] of the second input data B[15:0] and may output the result data of the adding calculation. The second exponent adder 113 may perform an adding calculation of the output data of the first exponent adder 112 and a minus exponent bias value corresponding to a decimal number of '−127' in order to subtract the exponent bias value corresponding to a decimal number of '127' from the output data of the first exponent adder 112, thereby generating interim exponent data EM[7:0]. The interim exponent data EM[7:0] output from the second exponent adder 113 may be transmitted to the normalizer 110N.

The mantissa processing circuit 110M may include a mantissa multiplier 114. The mantissa multiplier 114 may receive first mantissa data M1[7:0] having 8 bits and second mantissa data M2[7:0] having 8 bits. The first mantissa data M1[7:0] having 8 bits may be comprised of the first mantissa data M1[6:0] having 7 bits included in the first input data A[15:0] and an implied datum IB having one bit. The second mantissa data M2[7:0] having 8 bits may be comprised of the second mantissa data M2[6:0] having 7 bits included in the second input data B[15:0] and the implied datum TB having one bit. The implied datum IB means a binary number of "1" that precedes a floating-point. The mantissa multiplier 114 may perform a multiplying calculation of the first mantissa data M1[7:0] having 8 bits and the second mantissa data M2[7:0] having 8 bits to generate first interim mantissa data MM13[15:0] having 16 bits as a result of the multiplying calculation. The first interim mantissa data MM13[15:0] having 16 bits generated by the mantissa multiplier 114 may be transmitted to the normal zer 110N.

The normalizer 110N may include a floating-point shifter 115, a multiplexer 116, a round processor 117, and a third exponent adder 118. The floating-point shifter 115 of the normalizer 110N may receive the first interim mantissa data MM13[15:0] having 16 bits from the mantissa multiplier 114 and may shift a floating-point of the first interim mantissa data MM13[15:0] by one bit toward a most significant bit (MSB) of the first interim mantissa data MM13[15:0] to generate and output second interim mantissa data MM23[15:0]. The floating-point of the second interim mantissa data MM23[15:0] may be located between the fifteenth bit MM23[14] and the MSB MM23[15] of the second interim mantissa data MM23[15:0].

The multiplexer 116 of the normalizer 110N may receive the first interim mantissa data MM13[15:0] from the mantissa multiplier 114 through a first input terminal IN1 of the multiplexer 116. The multiplexer 116 may also receive the second interim mantissa data MM23[15:0] from the floating-point shifter 115 through a second input terminal IN2 of the multiplexer 116. The multiplexer 116 may receive an MSB signal MM13[15] of the first interim mantissa data MM13[15:0] as a selection signal. When the MSB signal MM13[15] of the first interim mantissa data MM13[15:0] has a binary number of "0", the multiplexer 116 may output the first interim mantissa data MM13[15:0] input through the first input terminal IN1. In contrast, when the MSB signal MM13[15] of the first interim mantissa data MM13[15:0] has a binary number of "1", the multiplexer 116 may output the second interim mantissa data MM23[15:0] input through the second input terminal IN2.

The round processor 117 of the normalizer 110N may remove 9 bits including the implied bit from the 16-bit interim mantissa data output from the multiplexer 116 and may perform a rounding operation while the 9 bits including the implied bit are removed from the 16-bit interim mantissa data. During the rounding operation, an adding calculation for adding a value of "1" may be performed by a round-off operation or a round-up operation, The round processor 117 may output the third mantissa data M3[6:0] having 7 bits included in the multiplication result data AB[15:0].

The third exponent adder 118 of the normalizer 110N may perform an adding calculation for adding an MSB datum MM13[15] of the first interim mantissa data MM13[15:0] output from the mantissa multiplier 114 to the interim exponent data EM[7:0] output from the second exponent adder 113. The third exponent adder 118 may generate and output the third exponent data E3[7:0] having 8 bits included in the multiplication result data AB[15:0]. When the MSB datum MM13[15] of the first interim mantissa data MM13[15:0] has a binary number of "0", the third exponent data E3[7:0] output from the third exponent adder 118 may have the same value as the interim exponent data EM[7:0] output from the second exponent adder 113. When the MSB datum MM13[15] of the first interim mantissa data MM13[15:0] has a binary number of "1", the third exponent data E3[7:0] output from the third exponent adder 118 may have a value which is one larger than the interim exponent data EM[7:0] output from the second exponent adder 113.

Figure 3:
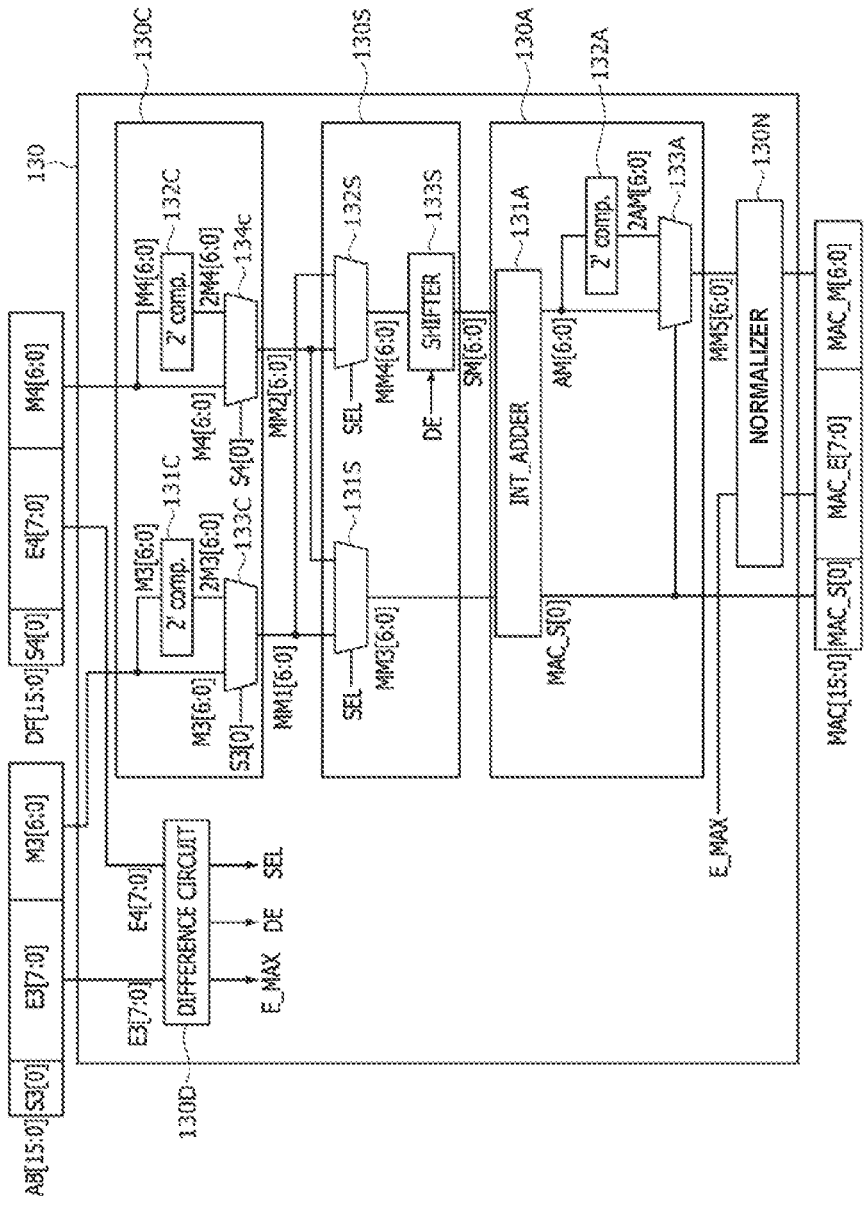
FIG. 3 illustrates an example of a configuration of an adder included in the multiple operation circuit illustrated in FIG. 1.

FIG. 3 illustrates an example of a configuration of the adder 130 included in the multiple operation circuit 100 illustrated in FIG. 1. Hereinafter, it may be assumed that the adder 130 receives the multiplication result data AB[15:0] and the feedback data DF[15:0] which are output from respective ones of the second selector 122 and the third selector 123. In an embodiment, the multiplication result data AB[15:0] may correspond to the output data of the multiplier 110 described with reference to FIG. 2. In such a case, the multiplication result data AB[15:0] may be comprised of the third sign datum S3[0] having one bit, the third exponent data E3[7:0] having 8 bits, and the third mantissa data M3[6:0] having 7 bits, as mentioned previously. In the present embodiment, it may be assumed that the feedback data DF[15:0] are comprised of a fourth sign datum S4[0] having one bit, fourth exponent data E4[7:0] having 8 bits, and fourth mantissa data M4[6:0] having 7 bits. Similarly, it may be assumed that the MAC data MAC[15:0] are comprised of a sign datum MAC_S[0] having one bit, exponent data MAC_E[7:0] having 8 bits, and mantissa data MAC_M[6:0] having 7 bits.

Referring to FIG. 3, the adder 130 may include a difference circuit 130D, a 2's complement processing circuit 130C, a shifting circuit 130S, an adding circuit 130A, and a normalizer 130N. The difference circuit 130D may receive the third exponent data E3[7:0] of the multiplication result data AB[15:0] and the fourth exponent data E4[7:0] of the feedback data DF[15:0]. The difference circuit 130D may compare the third exponent data E3[7:0] with the fourth exponent data E4[7:0] to output maximum exponent data E_MAX which correspond to the data having a larger value out of the third exponent data E3[7:0] and the fourth exponent data E4[7:0], The difference circuit 130D may also output exponent difference data DE corresponding to a difference value between the third exponent data E3[7:0] and the fourth exponent data E4[7:0], In addition, the difference circuit 130D may output a selection signal SEL which is determined according to target data to be shifted out of the third exponent data E3[7:0] and the fourth exponent data E4[7:0], The maximum exponent data E_MAX output from the difference circuit 130D may be transmitted to the normalizer 130N. The exponent difference data DE and the selection signal SEL output from the difference circuit 130D may be transmitted to the shifting circuit 130S.

The 2's complement processing circuit 130C may include a first 2's complement processor 131C, a second 2's complement processor 132C, a first multiplexer 133C, and a second multiplexer 134C. The first 2's complement processor 131C may receive the third mantissa data M3[6:0] of the multiplication result data AB[15:0]. The first 2's complement processor 131C may calculate a 2's complement value of the third mantissa data M3[6:0] to generate and output third 2's complement data 2M3[6:0]. The second 2's complement processor 132C may receive the fourth mantissa data M4[6:0] of the feedback data DE[15:0]. The second 2's complement processor 132C may calculate a 2's complement value of the fourth mantissa data M4[6:0] to generate and output fourth 2's complement data 2M4[6:0].

The first multiplexer 133C may receive the third mantissa data M3[6:0] of the multiplication result data AB[15:0] through a first input terminal of the first multiplexer 133C. The first multiplexer 133C may receive the third 2's complement data 2M3[6:0] from the first 2's complement processor 131C through a second input terminal of the first multiplexer 133C. The first multiplexer 133C may receive the third sign datum S3[0] of the multiplication result data AB[15:0] through a selection terminal of the first multiplexer 133C. The first multiplexer 133C may output the third mantissa data M3[6:0] input through the first input terminal or the third 2's complement data 2M3[6:0] input through the second input terminal according to the third sign datum S3[0]. In an embodiment, when the third sign datum S3[0] has a binary number of "0" meaning a positive number, the first multiplexer 133C may output the third mantissa data M3[6:0]. In contrast, when the third sign datum S3[0] has a binary number of "1" meaning a negative number, the first multiplexer 133C may output the third 2's complement data 2M3[6:0]. Hereinafter, the output data of the first multiplexer 133C will be referred to as first interim mantissa data MM1[6:0].

The second multiplexer 134C may receive the fourth mantissa data M4[6:0] of the feedback data DF[5:0] through a first input terminal of the second multiplexer 134C. The second multiplexer 134C may receive the fourth 2's complement data 2M4[6:0] from the second 2's complement processor 132C through a second input terminal of the second multiplexer 134C. The second multiplexer 134C may receive the fourth sign datum S4[0] of the feedback data DF[15:0] through a selection terminal of the second multiplexer 134C. The second multiplexer 134C may output the fourth mantissa data M4[6:0] input through the first input terminal or the fourth 2's complement data 2M4[6:0] input through the second input terminal according to the fourth sign datum S4[0]. In an embodiment, when the fourth sign datum S4[0] has a binary number of "0" meaning a positive number, the second multiplexer 134C may output the fourth mantissa data M4[6:0], In contrast, when the fourth sign datum S4[0] has a binary number of "1" meaning a negative number, the second multiplexer 134C may output the fourth 2's complement data 2M4[6:0]. Hereinafter, the output data of the second multiplexer 134C will be referred to as second interim mantissa data MM2[6:0].

The shifting circuit 130S may include a third multiplexer 131S, a fourth multiplexer 132S, and a shifter 133S. The third multiplexer 131S may receive the first interim mantissa data MM1[6:0] from the first multiplexer 133C of the 2's complement processing circuit 130C through a first input terminal of the third multiplexer 131S. The third multiplexer 131S may receive the second interim mantissa data MM2[6:0] from the second multiplexer 134C of the 2's complement processing circuit 130C through a second input terminal of the third multiplexer 131S. The third multiplexer 131S may receive the selection signal SEL from the difference circuit 130D through a selection terminal of the third multiplexer 131S. The third multiplexer 131S may output the first interim mantissa data MM1[6:0] or the second interim mantissa data MM2[6:0] according to the selection signal SEL. In an embodiment, when the selection signal SEL has a first logic level (e.g., a logic "low" level), the third multiplexer 131S may output the first interim mantissa data MM1[6:0]. In contrast, when the selection signal SEL has a second logic level (e.g., a logic "high" level), the third multiplexer 131S may output the second interim mantissa data MM2[6:0], Hereinafter, the output data of the third multiplexer 131S will be referred to as third interim mantissa data MM3[6:0].

The fourth multiplexer 132S may receive the second interim mantissa data MM2[6:0] from the second multiplexer 134C of the 2's complement processing circuit 130C through a first input terminal of the fourth multiplexer 132S. The fourth multiplexer 132S may receive the first interim mantissa data MM1[6:0] from the first multiplexer 133C of the 2's complement processing circuit 130C through a second input terminal of the fourth multiplexer 132S. The fourth multiplexer 132S may receive the selection signal SEL from the difference circuit 130D through a selection terminal of the fourth multiplexer 132S. The fourth multiplexer 132S may output the second interim mantissa data MM2[6:0] or the first interim mantissa data MM1[6:0] according to the selection signal SEL. In an embodiment, when the selection signal SEL has a first logic level (e.g., a logic "low" level), the fourth multiplexer 132S may output the second interim mantissa data MM2[6:0]. In contrast, when the selection signal SEL has a second logic level (e.g., a logic "high" level), the fourth multiplexer 132S may output the first interim mantissa data MM1[6:0]. Hereinafter, the output data of the fourth multiplexer 132S will be referred to as fourth interim mantissa data MM4[6:0].

The shifter 133S may perform a shifting operation for the mantissa bits of the multiplication result data AB[15:0] or the feedback data DF[15:0] such that the third exponent data E3[7:0] of the multiplication result data AB[15:0] input to the adder 130 are consistent with the fourth exponent data E4[7:0] of the feedback data DF[15:0] input to the adder 130. Specifically, the shifter 133S may receive the fourth interim mantissa data MM4[6:0] from the fourth multiplexer 132S. The fourth interim mantissa data MM4[6:0] may be the third 2's complement data 2M3[6:0] (or the third mantissa data M3[6:0] of the multiplication result data AB[15:0]) or the fourth 2's complement data 2M4[6:0] (or the fourth mantissa data M4[6:0] of the feedback data DF[15:0]). The shifter 133S may also receive the exponent difference data DE from the difference circuit 130D. The shifter 133S may shift the fourth interim mantissa data MM4[6:0] by the number of bits corresponding to the exponent difference data DE to generate shifted mantissa data SM[6:0].

In the present embodiment, the shifter 133S may be configured to shift the bits included in the fourth interim mantissa data MM4[6:0] in a left direction. However, the present embodiment may be merely an example of the present disclosure. Accordingly, in some other embodiments, the shifter 133S may be configured to shift the bits included in the fourth interim mantissa data MM4[6:0] in a right direction. When the shifter 133S is configured to shift the bits included in the fourth interim mantissa data MM4[6:0] in a left direction like the present embodiment, the mantissa data having a relatively smaller value as the fourth interim mantissa data MM4[6:0] may be transmitted to the shifter 133S. Alternatively, when the shifter 133S is configured to shift the bits included in the fourth interim mantissa data MM4[6:0] in a right direction, the mantissa data having a relatively larger value as the fourth interim mantissa data MM4[6:0] may be transmitted to the shifter 133S. The mantissa data input to the shifter 133S may be selected by the selection signal SEL which is transmitted from the difference circuit 130D to the selection terminals of the third and fourth multiplexers 131S and 132S.

The adding circuit 130A may include an integer adder 131A, a third 2's complement processor 132A, and a fifth multiplexer 133A. The integer adder 131A may receive the third interim mantissa data MM3[6:0] and the shifted mantissa data SM[6:0] from respective ones of the third multiplexer 131S and the shifter 133S included in the shifting circuit 130S. In addition, the integer adder 131A may receive the third sign datum S3[0] and the fourth sign datum S4[0]. The integer adder 131A may generate and output the sign datum MAC_S[0] of the MAC data MAC[15:0] according to a result of an adding calculation of the third sign datum S3[0], the fourth sign datum S4[0], the third interim mantissa data MM3[6:0], and the shifted mantissa data SM[6:0]. Moreover, the integer adder 131A may perform an adding calculation of the third interim mantissa data MM3[6:0] and the shifted mantissa data SM[6:0] to generate and output addition mantissa data AM[6:0]. In an embodiment, when both of the third sign datum S3[0] and the fourth sign datum S4[0] have a binary number of "0" meaning a positive number, the integer adder 131A may output a binary number of "0" as the sign datum MAC_S[0] of the MAC data MAC[15:0]. When both of the third sign datum S3[0] and the fourth sign datum S4[0] have a binary number of "1" meaning a negative number, the integer adder 131A may output a binary number of "1" as the sign datum MAC_S[0] of the MAC data MAC[15:0]. When one of the third sign datum S3[0] and the fourth sign datum S4[0] has a binary number of "0" and the other of the third sign datum S3[0] and the fourth sign datum S4[0] has a binary number of "1", the integer adder 131A may output a binary number of "0" as the sign datum MAC_S[0] if roundup occurs as a result of the adding calculation of the third interim mantissa data MM3[6:0] and the shifted mantissa data SM[6:0] and may output a binary number of "1" as the sign datum MAC_S[0] if no roundup occurs as a result of the adding calculation of the third interim mantissa data MM3[6:0] and the shifted mantissa data SM[6:0]. The integer adder 131A may output the sign datum MAC_S[0] of the MAC data MAC[15:0] through a first output terminal and may output the addition mantissa data AM[6:0] through a second output terminal.

The third 2's complement processor 132A may receive the addition mantissa data AM[6:0] output from the integer adder 131A through the second output terminal of the integer adder 131A. The third 2's complement processor 132A may calculate a 2's complement of the addition mantissa data AM[6:0] to output the 2's complement of the addition mantissa data AM[6:0] as 2's complement addition mantissa data 2AM[6:0]. The fifth multiplexer 133A may receive the addition mantissa data AM[6:0], which are output from the integer adder 131A through the second output terminal of the integer adder 131A, through a first input terminal of the fifth multiplexer 133A. The fifth multiplexer 133A may receive the 2's complement addition mantissa data 2AM[6:0] from the third 2's complement processor 132A through a second input terminal of the fifth multiplexer 133A. The fifth multiplexer 133A may receive the sign datum MAC_S[0] of the MAC data MAC[15:0], which is output from the integer adder 131A through the first output terminal of the integer adder 131A, through a selection terminal of the fifth multiplexer 133A. The fifth multiplexer 133A may output the addition mantissa data AM[6:0] input through the first input terminal of the fifth multiplexer 133A or the 2's complement addition mantissa data 2AM[6:0] input through the second input terminal of the fifth multiplexer 133A through an output terminal of the fifth multiplexer 133A according to the sign datum MAC_S[0] of the MAC data MAC[15:0]. In an embodiment, when the sign datum MAC_S[0] has a binary number of "0" meaning a positive number, the fifth multiplexer 133A may output the addition mantissa data AM[6:0]. In contrast, when the sign datum MAC_S[0] has a binary number of "1" meaning a negative number, the fifth multiplexer 133A may output the 2's complement addition mantissa data 2AM[6:0]. Hereinafter, the output data of the fifth multiplexer 133A will be referred to as fifth interim mantissa data MM5[6:0].

The normalizer 130N may have a first input terminal, a second input terminal, a first output terminal, and a second output terminal. The normalizer 130N may receive the maximum exponent data E_MAX from the difference circuit 130D through the first input terminal of the normalizer 130N. The normalizer 130N may receive the fifth interim mantissa data MM5[6:0] from the fifth multiplexer 133A through the second input terminal of the normalizer 130N. The normalizer 130N may output the maximum exponent data E_MAX input through the first input terminal as the exponent data MAC_E[7:0] of the MAC data MAC[15:0] through the first output terminal of the normalizer 130N. In addition, the normalizer 130N may perform a rounding operation for the fifth interim mantissa data MM5[6:0] input through the second input terminal, thereby generating and outputting the mantissa data MAC_M[6:0] of the MAC data MAC[15:0] through the second output terminal of the normalizer 130N.

Figure 4:
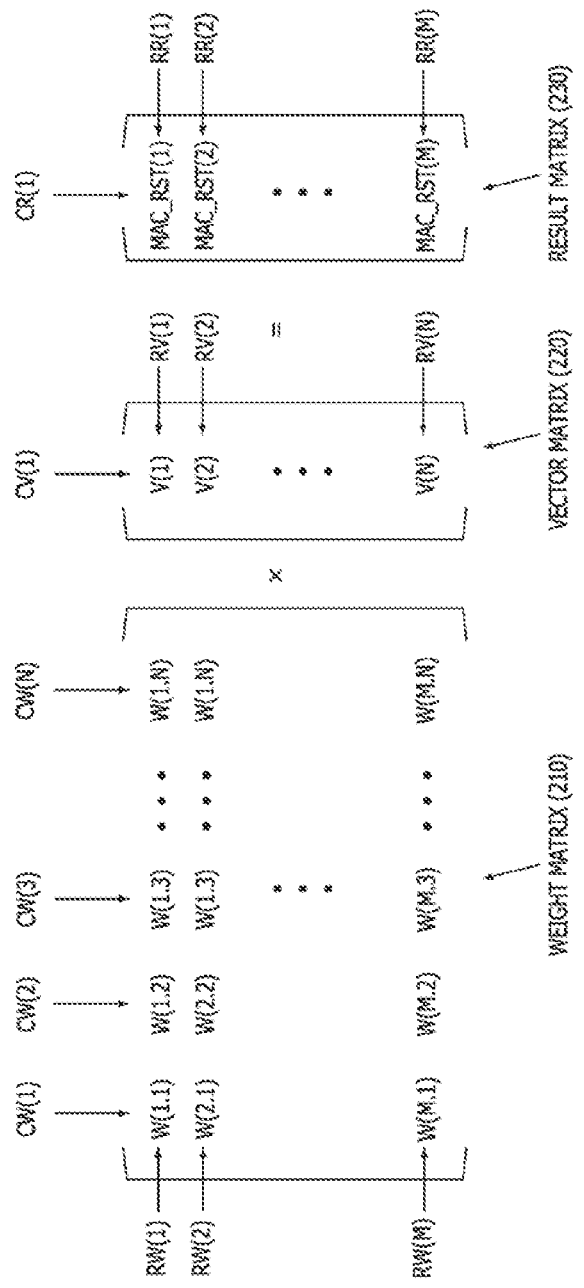
FIG. 4 illustrates an example of a matrix-vector multiplying calculation executed by a multiplication/accumulation (MAC) operation in a first operation mode of the multiple operation circuit illustrated in FIG. 1.

FIG. 4 illustrates an example of the matrix-vector multiplying calculation executed by the MAC operation in the first operation mode of the multiple operation circuit 100 illustrated in FIG. 1. Referring to FIG. 4, the multiple operation circuit 100 may execute the matrix-vector multiplying calculation of a weight matrix 210 and a vector matrix 220 to perform the MAC operation for generating a result matrix 230. The weight matrix 210 may have "M"-number of rows (i.e., first to $M^{th}$ rows RW(1), RW(2), ... , and RW(M)) and "N"-number of columns (i.e., first to $N^{th}$ columns CW(1), CW(2), ..., and CW(N)) (where, "M" and "N" are natural numbers which are equal to or greater than two). The vector matrix 220 may have "N"-number of rows (i.e., first to $N^{th}$ rows RV(1), RV(2), ... , and RV(N)) and one column CV(1). The result matrix 230 may have "M"-number of rows (i.e., first to $M^{th}$ rows RR(1), RR(2), ... , and RR(M)) and one column CR(1).

The weight matrix 210 may have "MxN"-number of weight elements, that is, W(1.1)~W(1.N), ..., and W(M.1)~W(M.N). The vector matrix 220 may have "N"-number of vector elements, that is, V(1), V(2), ..., and V(N). The result matrix 230 may have "M"-number of result elements, that is, MAC_RST(1), MAC_RST(2), ..., and MAC_RST(M). Hereinafter, a term "weight data" may be construed as having the same meaning as the term "weight element", and a term "vector data" may be construed as having the same meaning as the term "vector element", In addition, a term "MAC result data" may be construed as having the same meaning as the term "result element". Hereinafter, it may be assumed that the weight data and the vector data have a 16-bit floating-point format, for example, a 16-bit brain floating-point (BF16) format.

The MAC result data MAC_RST(1) in the first row RR(1) of the result matrix 230 may be generated by the matrix-vector multiplying calculation of the weight data W(1.1)~W(1.N) in the first row RW(1) of the weight matrix 210 and the vector data V(1)~V(N) of the vector matrix 220. The MAC result data MAC_RST(2) in the second row RR(2) of the result matrix 230 may be generated by the matrix-vector multiplying calculation of the weight data W(2.1)~W(2.N) in the second row RW(2) of the weight matrix 210 and the vector data V(1)~V(N) of the vector matrix 220. Similarly, the MAC result data MAC_RST(M) in the $M^{th}$ row RR(M) of the result matrix 230 may be generated by the matrix-vector multiplying calculation of the weight data W(M.1) ~W(M.N) in the $M^{th}$ row RW(M) of the weight matrix 210 and the vector data V(1)~V(N) of the vector matrix 220.

FIG. 5 illustrates an example of an execution process of the matrix-vector multiplying calculation illustrated in FIG. 4. The multiple operation circuit 100 may perform the MAC operation for the weight data (e.g., W(1.1)~W(1.N), W(2.1) ~W(2.N), . . . , or W(M. 1)~W(M.N)) arrayed in any one row among the first to $M^{th}$ rows RW(1)~RW(M) of the weight matrix 210 with the vector data of the vector matrix 220. For example, as illustrated in FIG. 5, the multiple operation circuit 100 may perform the MAC operation of the weigh data W(1.1)~W(1.N) in the first row RW(1) of the weight matrix 210 and the vector data V(1)~V(N) of the vector matrix 220 to generate the MAC result data MAC_RST (1) in the first row RR (1) of the result matrix 230.

Specifically, the multiple operation circuit 100 may perform a first MAC operation using the weight data W(1.1) located at a cross point of the first row RW(1) and the first column CW(1) of the weight matrix 210 and the vector data V(1) located in the first row RV(1) of the vector matrix 220 as input data, thereby generating first MAC data MAC1[15:0]. Next, the multiple operation circuit 100 may perform a second MAC operation of the weight data W(1.2) located at a cross point of the first row RW(1) and the second column CW(2) of the weight matrix 210 and the vector data V(2) located in the second row RV(2) of the vector matrix 220 to generate second MAC data MAC2[15:0]. The second MAC operation may include an accumulative adding calculation for accumulatively adding a result of the multiplying calculation of the weight data W(1.2) and the vector data V(2) to the first MAC data MAC1[15:0].

Figure 6:
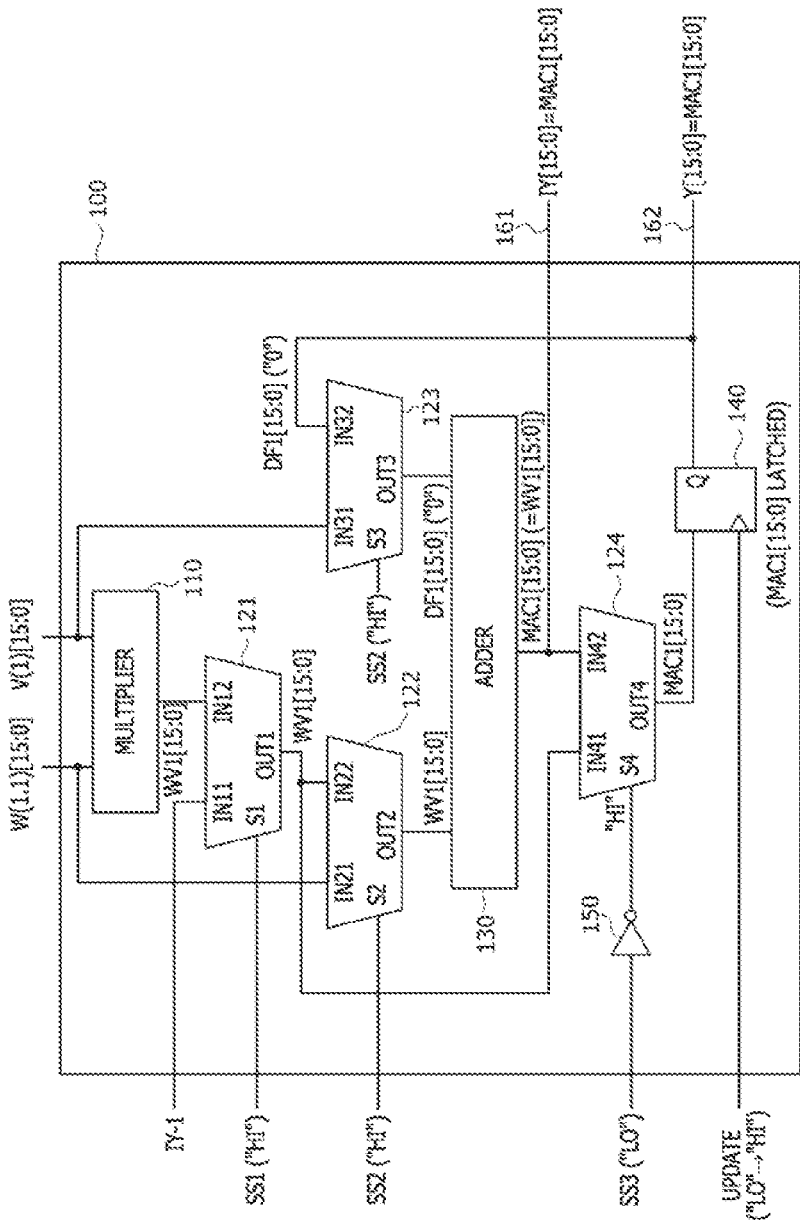
FIG. 6 illustrates a first MAC operation of the matrix-vector multiplying calculation process illustrated in FIG. 5.

Subsequently, the multiple operation circuit 100 may perform a third MAC operation of the weight data W(1.3) located at a cross point of the first row RW(1) and the third column CW(3) of the weight matrix 210 and the vector data V(3) located in the third row RV(3) of the vector matrix 220 to generate third MAC data MAC3[15:0]. The third MAC operation may include an accumulative adding calculation for adding a result of the multiplying calculation of the weight data W(1.3) and the vector data V(3) to the second MAC data MAC2[15:0]. These MAC operations may be continuously performed until an $N^{th}$ MAC operation for multiplying the weight data W(1.N) located at a cross point of the first row RW(1) and the $N^{th}$ column CW(N) of the weight matrix 210 by the vector data V(N) located in the $N^{th}$ row RV(N) of the vector matrix 220 is performed. The $N^{th}$ MAC operation may an accumulative adding calculation for adding a result of the multiplying calculation of the weight data W(1.N) and the vector data V(N) to a result of the $(N-1)^{th}$ MAC operation, $N^{th}$ MAC data MAC"N"[15:0] generated by the $N^{th}$ MAC operation may correspond to the MAC result data MAC_RST(1) in the first row RR(1) of the result matrix 230, FIG. 6 illustrates the first MAC operation of FIG. 5 performed by the multiple operation circuit 100 illustrated in FIG. 1. In FIG. 6, the same reference numerals or symbols as used in FIG. 1 denote the same elements. Referring to FIG. 6, in order to perform the first MAC operation of the multiple operation circuit 100, the first selection signal SS1 having a logic "high(HI)" level, the second selection signal SS2 having a logic "high(HI)" level, and the third selection signal SS3 having a logic "low(LO)" level may be sequentially transmitted to the multiple operation circuit 100. A level of the update signal UPDATE may change from a logic "low(LO)" level into a logic "high(HI)" level before a point in time when the second selection signal SS2 is transmitted to the multiple operation circuit 100 and after a point in time when the third selection signal SS3 is transmitted to the multiple operation circuit 100. The weight data W(1.1)[15:0] located at a cross point of the first row RW(1) and the first column CW(1) of the weight matrix (210 of FIG. 4) may be input to the first input terminal of the multiplier 110. The vector data V(1) in the first row RV(1) of the vector matrix (220 of FIG. 4) may be input to the second input terminal of the multiplier 110. As described with reference to FIG. 2, the multiplier 110 may perform a multiplying calculation of the weight data W(1.1)[15:0] and the vector data V(1) to generate and output first multiplication result data WV1[15:0] through the output terminal of the multiplier 110.

The first selector 121 receiving the first selection signal SS1 having the logic "high(HI)" level may output the first multiplication result data WV1[15:0], which are input through the second input terminal IN12 of the first selector 121, through the output terminal OUT1. The first multiplication result data WV1[15:0] output from the first selector 121 may be transmitted to the second input terminal IN22 of the second selector 122. The first multiplication result data WV1[15:0] output from the first selector 121 may also be transmitted to the first input terminal IN41 of the fourth selector 124. When a level of the update signal UPDATE changes from a logic "low(LO)" level into a logic "high (HI)" level, the latch circuit 140 may output its latched data as first feedback data DF1[15:0] which are transmitted to the second input terminal IN32 of the third selector 123. In such a case, because the latch circuit 140 has an initialized state, the first feedback data DF1[15:0] may have a value of zero. After the latch circuit 140 outputs the first feedback data DF1[15:0] having a value of zero, a level of the update signal UPDATE may change from a logic "high(HI)" level into a logic "low(LO)" level.

The second selector 122 receiving the second selection signal SS2 having the logic "high(HI)" level may output the first multiplication result data WV1[15:0], which are transmitted from the first selector 121 to the second input terminal IN22 of the second selector 122, through the output terminal OUT2. The first multiplication result data WV1 [15:0] output from the second selector 122 may be transmitted to the first input terminal of the adder 130. The third selector 123 receiving the second selection signal SS2 having the logic "high(HI)" level may output the first feedback data DF1[15:0], which are transmitted from the latch circuit 140 to the second input terminal IN32 of the third selector 123, through the output terminal OUT3 of the third selector 123. The first feedback data DF1[15:0] output from the third selector 123 may be transmitted to the second input terminal of the adder 130.

The adder 130 may perform an adding calculation using the first multiplication result data WV1[15:0] input to the first input terminal and the first feedback data DF1[15:0] input to the second input terminal as input data, thereby generating and outputting the first MAC data MAC1[15:0]. Because the first feedback data DF1[15:0] have a value of zero, the first MAC data MAC1[15:0] output from the adder 130 may have the same value as the first multiplication result data WV1[15:0] generated by the multiplier 110. The first MAC data MAC1[15:0] output from the adder 130 may be transmitted to the second input terminal IN42 of the fourth selector 124 through the output terminal of the adder 130. In addition, the first MAC data MAC1[15:0] output from the adder 130 may be output from the multiple operation circuit 100 through the first output line 161 to provide the interim result data IY[15:0], The inverter 150 may change a level of the third selection signal SS3 from a logic "low(LO)" level into a logic "high(HI)" level, and the third selection signal SS3 having a logic "high(HI)" level may be transmitted to the fourth selector 124. The fourth selector 124 receiving the third selection signal SS3 having a logic "high(HI)" level may output the first MAC data MAC1[1:0], which are transmitted from the adder 130 to the second input terminal IN42, through the output terminal OUT4. The first MAC data MAC1[15:0] output from the fourth selector 124 may be transmitted to the input terminal of the latch circuit 140.

When a level of the update signal UPDATE changes from a logic "low(LO)" level into a logic "high(HI)" level, the latch circuit 140 may latch the first MAC data MAC1[15:0] transmitted to the input terminal of the latch circuit 140. In addition, the latch circuit 140 may output the latched data of the first MAC data MAC1[15:0] through the output terminal Q of the latch circuit 140. The first MAC data MAC1[15:0] output from the latch circuit 140 may be transmitted to the second input terminal IN32 of the third selector 123 to provide feedback data which are used for the second MAC operation to be performed at a next step. The first MAC data MAC1[15:0] output from the latch circuit 140 may also be output from the multiple operation circuit 100 through the second output line 162. After the latch circuit 140 outputs the first MAC data MAC1[15:0], a level of the update signal UPDATE may change from a logic "high(HI)" level into a logic "low(LO)" level.

Figure 7:
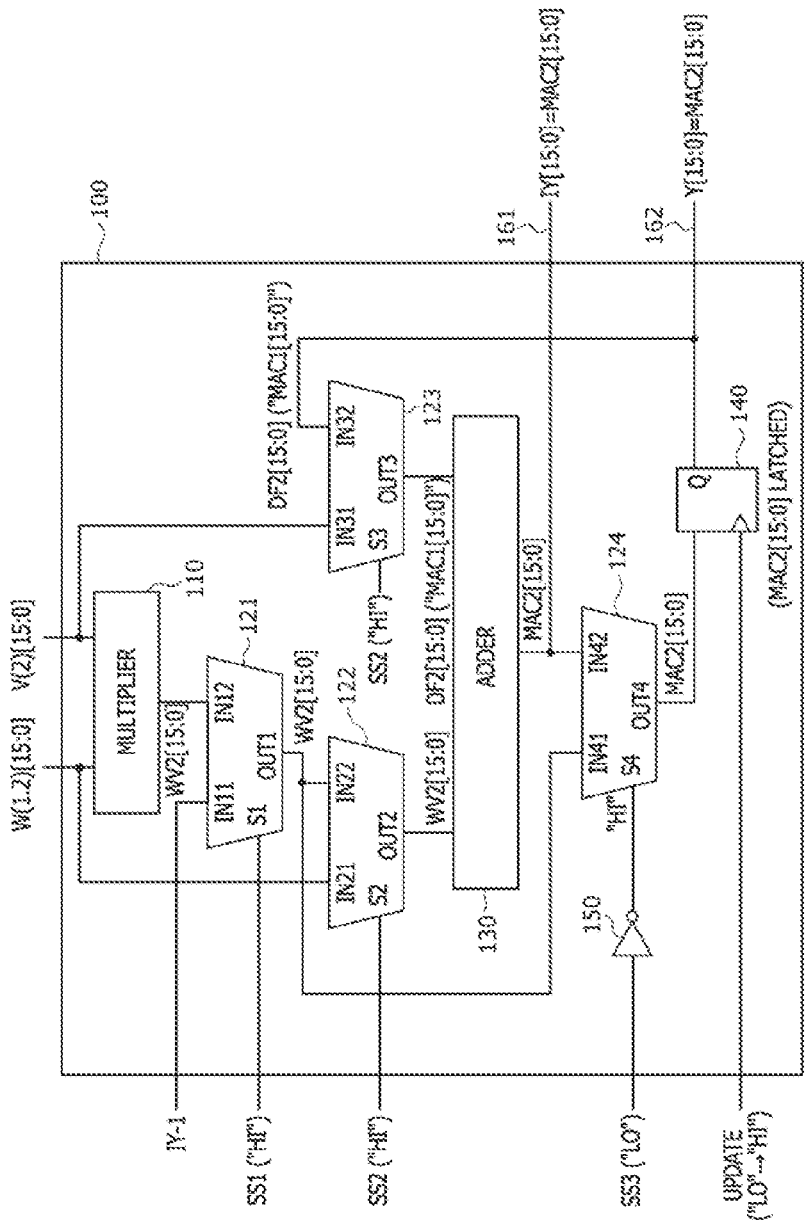
FIG. 7 illustrates a second MAC operation of the matrix-vector multiplying calculation process illustrated in FIG. 5.

FIG. 7 illustrates the second MAC operation of FIG. 5 performed by the multiple operation circuit 100 illustrated in FIG. 1. In FIG. 7, the same reference numerals or symbols as used in FIG. 1 denote the same elements. Referring to FIG. 7, in order to perform the second MAC operation of the multiple operation circuit 100, the first selection signal SS1 having a logic "high(HI)" level, the second selection signal SS2 having a logic "high(HI)" level, and the third selection signal SS3 having a logic "low(LO)" level may be sequentially transmitted to the multiple operation circuit 100. A level of the update signal UPDATE may change from a logic "low(LO)" level into a logic "high(HI)" level before a point in time when the second selection signal SS2 is transmitted to the multiple operation circuit 100 and after a point in time when the third selection signal SS3 is transmitted to the multiple operation circuit 100. The weight data W(1.2)[15:0] located at a cross point of the first row RW(1) and the second column CW(2) of the weight matrix (210 of FIG. 4) may be input to the first input terminal of the multiplier 110. The vector data V(2) in the second row RV(2) of the vector matrix (220 of FIG. 4) may be input to the second input terminal of the multiplier 110. The multiplier 110 may perform a multiplying calculation of the weight data W(1.2)[15:0] and the vector data V(2) to generate and output second multiplication result data WV2[15:0] through the output terminal of the multiplier 110.

The first selector 121 receiving the first selection signal SS1 having the logic "high(HI)" level may output the second multiplication result data WV2[15:0], which are input through the second input terminal IN12 of the first selector 121, through the output terminal OUT1. The second multiplication result data WV2[15:0] output from the first selector 121 may be transmitted to the second input terminal IN22 of the second selector 122. The second multiplication result data WV2[15:0] output from the first selector 121 may also be transmitted to the first input terminal IN41 of the fourth selector 124. When a level of the update signal UPDATE transmitted to the clock terminal of the latch circuit 140 changes from a logic "low(LO)" level into a logic "high(HI)" level, the latch circuit 140 may output its latched data as second feedback data DF2[15:0] which are transmitted to the second input terminal IN32 of the third selector 123. In such a case, the second feedback data DF2[15:0] may correspond to the first MAC data MAC1[15:0] which are latched in the latch circuit 140 during the first MAC operation described with reference to FIGS. 5 and 6. After the latch circuit 140 outputs the second feedback data DF2[15:0], a level of the update signal UPDATE may change from a logic "low(LO)" level into a logic "high(HI)" level.

The second selector 122 receiving the second selection signal SS2 having the logic "high(HI)" level may output the second multiplication result data WV2[15:0], which are transmitted from the first selector 121 to the second input terminal IN22 of the second selector 122, through the output terminal OUT2. The second multiplication result data WV2[15:0] output from the second selector 122 may be transmitted to the first input terminal of the adder 130. The third selector 123 receiving the second selection signal SS2 having the logic "high(HI)" level through the selection terminal S3 may output the second feedback data DF2[15:0] (i.e., the first MAC data MAC1[15:0]), which are transmitted from the latch circuit 140 to the second input terminal IN32 of the third selector 123, through the output terminal OUT3 of the third selector 123. The first MAC data MAC1[15:0] output from the third selector 123 may be transmitted to the second input terminal of the adder 130.

The adder 130 may perform an adding calculation using the second multiplication result data WV2[15:0] input to the first input terminal and the first MAC data MAC1[15:0] input to the second input terminal as input data, thereby generating and outputting the second MAC data MAC2[15:0]. Accordingly, the second MAC data MAC2[15:0] output from the adder 130 may have a value that the second multiplication result data are accumulatively added to the first MAC data MAC1[15:0], as described with reference to FIG. 5. The second MAC data MAC2[15:0] output from the adder 130 may be transmitted to the second input terminal IN42 of the fourth selector 124 through the output terminal of the adder 130. In addition, the second MAC data MAC2[15:0] output from the adder 130 may be output from the multiple operation circuit 100 through the first output line 161 to provide the interim result data IY[15:0]. The inverter 150 may change a level of the third selection signal SS3 from a logic "low(LO)" level into a logic "high(HI)" level, and the third selection signal SS3 having a logic "high(HI)" level may be transmitted to the selection terminal S4 of the fourth selector 124. The fourth selector 124 receiving the third selection signal SS3 having a logic "high(HI)" level may output the second MAC data MAC2[15:0], which are transmitted from the adder 130 to the second input terminal 11142, through the output terminal OUT4. The second MAC data MAC2[15:0] output from the fourth selector 124 may be transmitted to the input terminal of the latch circuit 140.

The latch circuit 140 may be synchronized with a rising edge of the update signal UPDATE to latch the second MAC data MAC2[15:0]. In addition, the latch circuit 140 may output the latched data of the second MAC data MAC2[15:0] through the output terminal Q of the latch circuit 140. The second MAC data MAC1[15:0] output from the latch circuit 140 may be transmitted to the second input terminal IN32 of the third selector 123 to provide feedback data which are used for a third MAC operation to be performed at a next step. The second MAC data MAC2[15:0] output from the latch circuit 140 may also be output from the multiple operation circuit 100 through the second output line 162.

After the latch circuit 140 outputs the second MAC data MAC2[15:0], a level of the update signal UPDATE may change from a logic "high(HI)" level into a logic "low(LO)" level.

Figure 8:
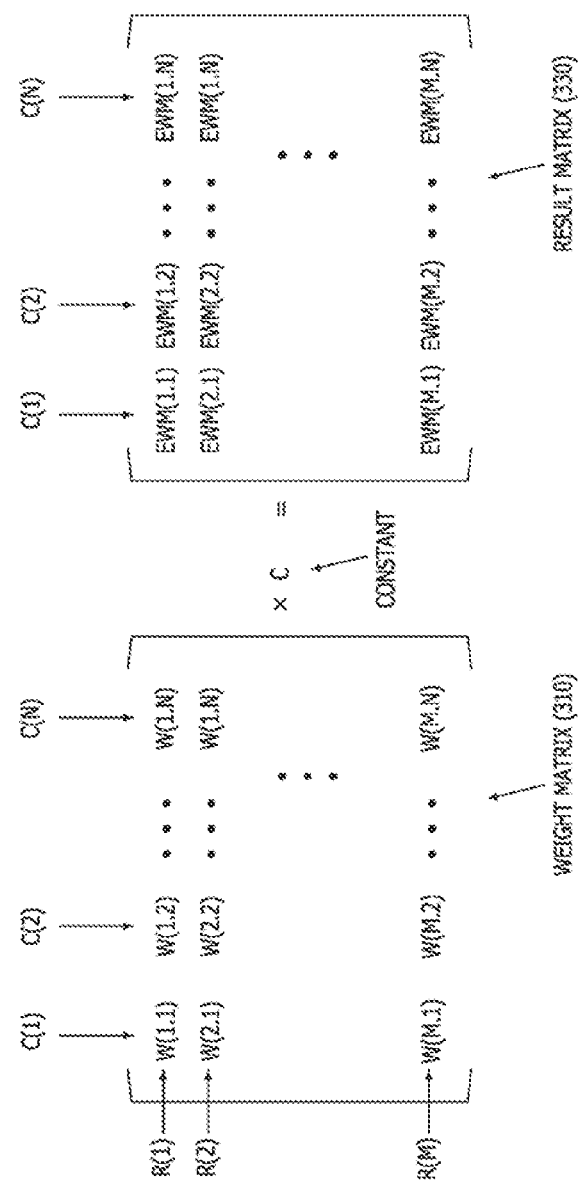
FIG. 8 illustrates an example of a matrix-scalar multiplying calculation executed by an element-wise (EW) multiplying calculation in a second operation mode of the multiple operation circuit illustrated in FIG. 1.

FIG. 8 illustrates an example of the matrix-scalar multiplying calculation executed by the EW multiplying calculation in the second operation mode of the multiple operation circuit 100 illustrated in FIG. 1. Referring to FIG. 8, the multiple operation circuit 100 may execute the matrix-scalar multiplying calculation of a weight matrix 310 and a constant C to perform the EW multiplying calculation for generating a result matrix 330. In the present embodiment, it may be assumed that the weight matrix 310 is the same as the weigh matrix 210 described with reference to FIG. 5. Thus, the weight matrix 310 may have "M×N" sets of weight data W(1.1)~W(1.N), . . . , and W(M.1)~W(M.N). In contrast, the constant C may be comprised of one datum. The result matrix 330 may have EWM result data EWM(1.1)~EWM(1.N), . . . , and EWM(M.1)~EWM(M.N), which are generated by the EW multiplying calculation of the multiple operation circuit 100, as elements of the result matrix 330. Accordingly, the result matrix 330 may have the same size as the weight matrix 310. That is, the result matrix 330 may have "M"-number of rows (i.e., first to $M^{th}$ rows R(1)~R(M)) and "N"-number of columns (i.e., first to $N^{th}$ columns C(1)~C(N)). The EWM result data EWMs corresponding to the elements of the result matrix 330 may be obtained by multiplying the weight data W(1.1)~W(1.N), . . . , and W(M.1)~W(M.N) by the constant C. As such, the EW multiplying calculation executed in the second operation mode of the multiple operation circuit 100 may be achieved using only the multiplying calculation without using any accumulative adding calculation.

Figure 9:
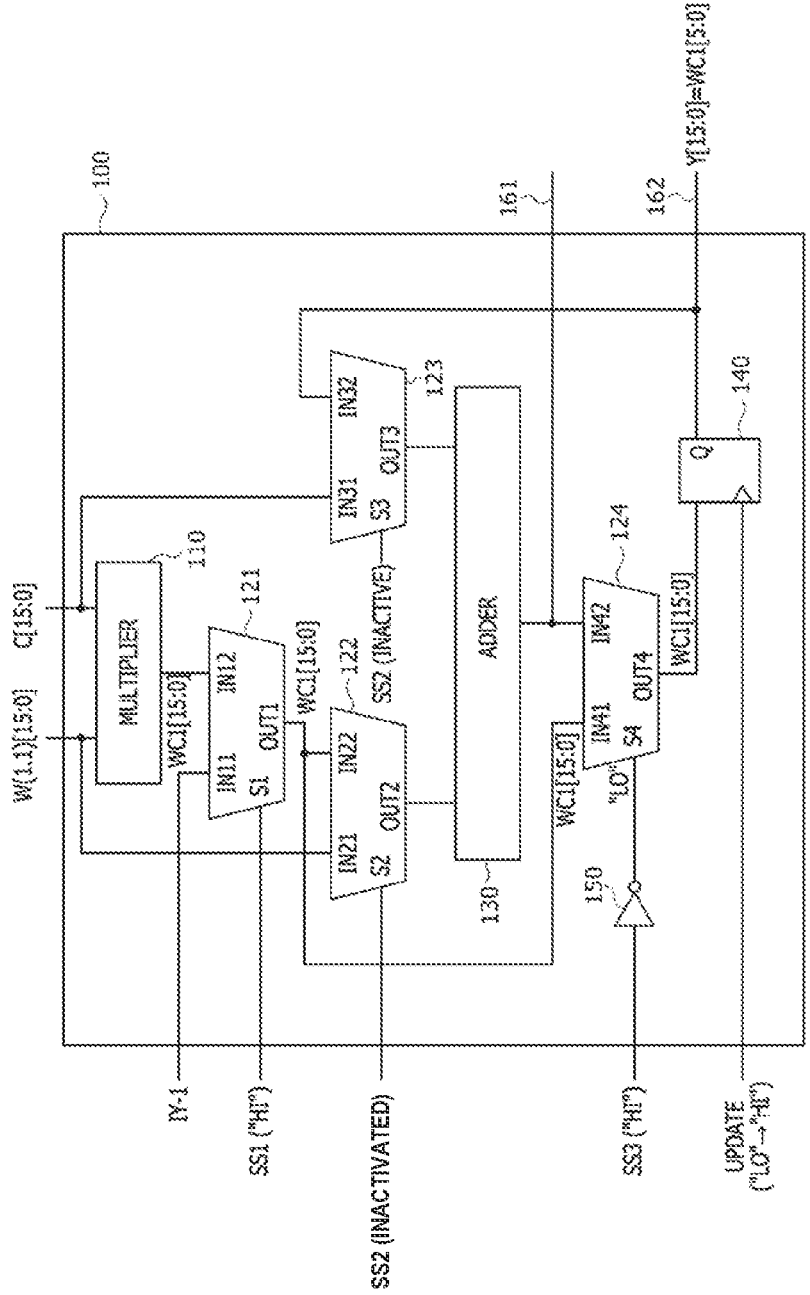
FIG. 9 illustrates the EW multiplying calculation illustrated in FIG. 8.

FIG. 9 illustrates the EW multiplying calculation of FIG. 8 executed by the multiple operation circuit 100 illustrated in FIG. 1. In FIG. 9, the same reference numerals or symbols as used in FIG. 1 denote the same elements. Referring to FIG. 9, in order to perform the EW multiplying calculation in the second operation mode of the multiple operation circuit 100, the first selection signal SS1 having a logic "high(HI)" level and the third selection signal SS3 having a logic "high(HI)" level may be applied to respective ones of the first selector 121 and the fourth selector 124. In such a case, the second selection signal SS2 is inactivated. Thus, the second and third selectors 122 and 123 do not operate. A level of the update signal UPDATE may change from a logic "low(LO)" level into a logic "high(HI)" level at a point in time when a certain time elapses from a point in time when the third selection signal SS3 is applied to the multiple operation circuit 100 (e.g., after the output data of the fourth selector 124 are transmitted to the input terminal of the latch circuit 140). The weight data W(1.1)[15:0] located at a cross point of the first row RW(1) and the first column CW(1) of the weight matrix (310 of FIG. 8) may be input to the first input terminal of the multiplier 110. Constant data C[15:0] may be input to the second input terminal of the multiplier 110. The constant data C[15:0] may be provided by transforming the constant (C of FIG. 8) into the same format (e.g., the BF16 format) as the weight data. The multiplier 110 may perform a multiplying calculation of the weight data W(1.1)[15:0] and the constant data C[15:0] to generate and output first multiplication result data WC1[15:0] through the output terminal of the multiplier 110.

The first selector 121 receiving the first selection signal SS1 having the logic "high(HI)" level may output the first multiplication result data WC1[15:0], which are input through the second input terminal IN12 of the first selector 121, through the output terminal OUT1. The first multiplication result data WC1[15:0] output from the first selector 121 may be transmitted to the second input terminal IN22 of the second selector 122 and the first input terminal IN41 of the fourth selector 124. Because the second selection signal SS2 is inactivated, the second and third selectors 122 and 123 do not operate and the adder 130 does not operate. The inverter 150 may change a level of the third selection signal SS3 from a logic "high(HI)" level into a logic "low(LO)" level, and the third selection signal SS3 having a logic "low(LO)" level may be transmitted to the selection terminal S4 of the fourth selector 124. The fourth selector 124 receiving the third selection signal SS3 having a logic "low(LO)" level may output the first multiplication result data WC1[15:0], which are transmitted from the output terminal OUT1 of the first selector 121 to the first input terminal IN41 of the fourth selector 124, through the output terminal OUT4. The first multiplication result data WC1[15:0] output from the fourth selector 124 may be transmitted to the input terminal of the latch circuit 140.

The latch circuit 140 may be synchronized with a rising edge of the update signal UPDATE to latch the first multiplication result data WC1[15:0]. In addition, the latch circuit 140 may output the latched data of the first multiplication result data WC1[15:0] through the output terminal Q of the latch circuit 140. After the latch circuit 140 outputs the first multiplication result data WC1[15:0], a level of the update signal UPDATE may change from a logic "high(HI)" level into a logic "low(LO)" level. The first multiplication result data WC1[15:0] output from the latch circuit 140 may be output from the multiple operation circuit 100 through the second output line 162. The first multiplication result data WC1[15:0] output from the multiple operation circuit 100 may correspond to the EWM result data EWM(1.1) located at a cross point of the first row R(1) and the first column C(1) of the result matrix 330 illustrated in FIG. 8.

Figure 10:
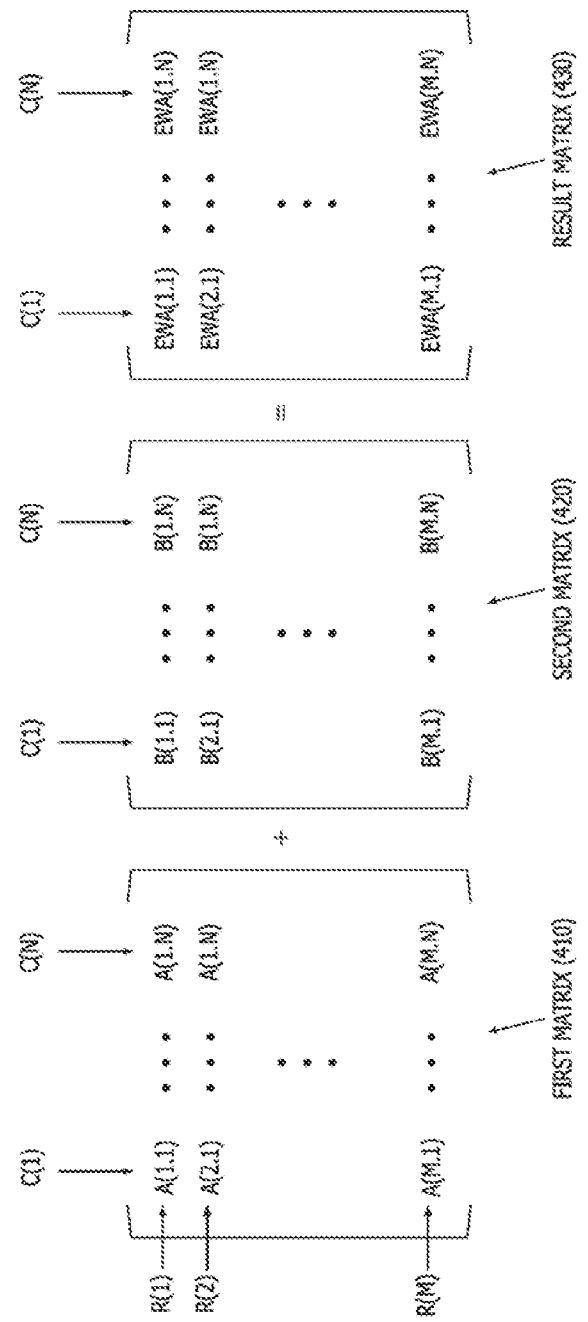
FIG. 10 illustrates an example of a matrix adding calculation executed by an element-wise (EW) adding calculation in a second operation mode of the multiple operation circuit illustrated in FIG. 1.

FIG. 10 illustrates an example of a matrix adding calculation executed by the EW adding calculation in the second operation mode of the multiple operation circuit 100 illustrated in FIG. 1. Referring to FIG. 10, the multiple operation circuit 100 may execute a matrix adding calculation of a first matrix 410 and a second matrix 420 to perform the EW adding calculation for generating a result matrix 430. In the present embodiment, it may be assumed that the first matrix 410 and the second matrix 420 may have the same form as the weight matrix 210 described with reference to FIG. 5. Thus, the first matrix 410 may have "M×N"-number of first data A(1.1)~A(1.N), . . . , and A(M.1)~A(M.N), and the second matrix 420 may also have "M×N"-number of second data B(1.1)~B(1.N), . . . , and B(M.1)~B(M.N). The result matrix 430 may have EWA result data EWA(1.1)~EWA(1.N), . . . , and EWA(M.1)~EWA(M.N), which are generated by the EW adding calculation of the multiple operation circuit 100, as elements of the result matrix 430. Accordingly, the result matrix 430 may have the same size as each of the first matrix 410 and the second matrix 420. That is, the result matrix 430 may have "M"-number of rows (i.e., first to $M^{th}$ rows R(1)~R(M)) and "N"-number of columns (i.e., first to $N^{th}$ columns C(1)~C(N)). The EWA result data EWMs corresponding to the elements of the result matrix 430 may be obtained by adding the first data A(1.1)~A(1.N), . . . , and A(M.1)~A(M.N) of the first matrix 410 to respective ones of the second data B(1.1)~B(1.N), . . . , and B(M.1)~B(M.N) of the second matrix 420. As such, the EW adding calculation executed in the second operation mode of the multiple operation circuit 100 may be achieved using only the adding calculation without using any multiplying calculation and any the accumulative adding calculation which are executed for the MAC operation.

Figure 11:
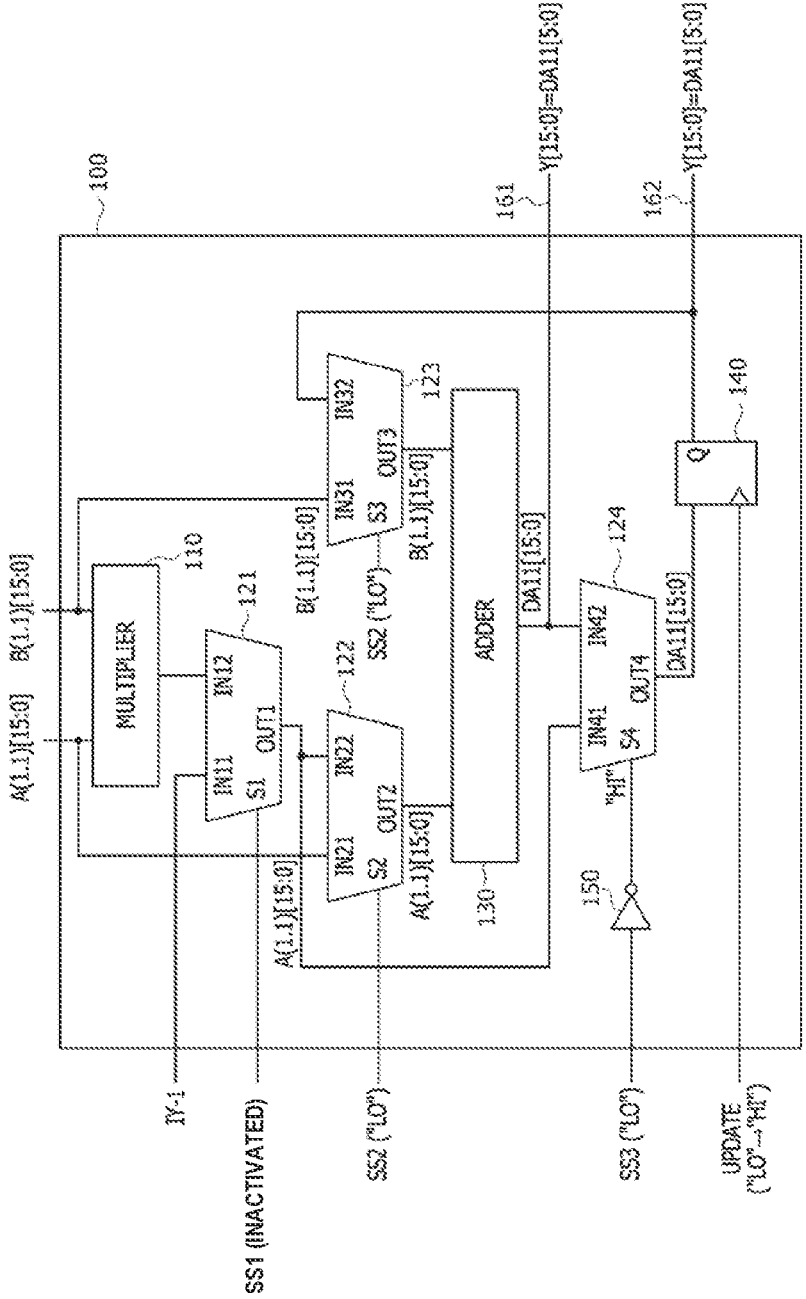
FIG. 11 illustrates the EW adding calculation illustrated in FIG. 10.

FIG. 11 illustrates the EW adding calculation of FIG. 10 executed by the multiple operation circuit 100 illustrated in FIG. 1. In FIG. 11, the same reference numerals or symbols as used in FIG. 1 denote the same elements. Referring to FIG. 11, in order to execute the EW adding calculation in the second operation mode of the multiple operation circuit 100, the second selection signal SS2 having a logic "low(LO)" level may be applied to the selection terminal S2 of the second selector 122 and the selection terminal S3 of the third selector 123. In addition, the third selection signal SS3 having a logic "low(LO)" level may be transmitted to an input terminals of the inverter 150 coupled to the selection terminal S4 of the fourth selector 124. The first selection signal SS1 may be inactivated so that the first selector does not operate. A level of the update signal UPDATE may change from a logic "low(LO)" level into a logic "high(HI)" level at a point in time when a certain time elapses from a point in time when the third selection signal SS3 is applied to the multiple operation circuit 100 (e.g., after the output data of the fourth selector 124 are transmitted to the input terminal of the latch circuit 140).

The first data A(1.1)[15:0] located at a cross point of the first row R(1) and the first column C(1) of the first matrix (410 of FIG. 10) may be transmitted to the first input terminal IN21 of the second selector 122. The second data B(1.1)[15:0] located at a cross point of the first row R(1) and the first column C(1) of the second matrix (420 of FIG. 10) may be transmitted to the first input terminal IN31 of the third selector 123. The second selector 122 receiving the second selection signal SS2 having a logic "low(LO)" level may output the first data A(1.1)[15:0], which are input to the first input terminal IN21, through the output terminal OUT2. The first data A(1.1)[15:0] output from the second selector 122 may be transmitted to the first input terminal of the adder 130. The third selector 123 receiving the second selection signal SS2 having a logic "low(LO)" level may output the second data B(1.1)[15:0], which are input to the first input terminal IN31, through the output terminal OUT3. The second data B(1.1)[15:0] output from the third selector 123 may be transmitted to the second input terminal of the adder 130.

The adder 130 may perform an adding calculation of the first data A(1.1)[15:0] input to the first input terminal and the second data B(1.1)[15:0] input to the second input terminal, thereby generating addition result data DA11[15:0]. The addition result data DA11[15:0] generated by the adder 130 may be transmitted to the second input terminal IN42 of the fourth selector 124 through the output terminal of the adder 130. In addition, the addition result data DA11[15:0] generated by the adder 130 may be output from the multiple operation circuit 100 through the first output line 161 to provide the interim result data IY[15:0]. The fourth selector 124 receiving a logic "high(HI)" level output from the inverter 150 may output the addition result data DA11[15:0], which are transmitted from the adder 130 to the second input terminal IN42 of the fourth selector 124, through the output terminal OUT4. The addition result data DA11[15:0] output from the fourth selector 124 may be transmitted to the input terminal of the latch circuit 140.

The latch circuit 140 may be synchronized with a rising edge of the update signal UPDATE to latch the addition result data DA11[15:0] output from the fourth selector 124. In addition, the latch circuit 140 may output the latched data of the addition result data DA11[15:0] through the output terminal Q of the latch circuit 140. After the latch circuit 140 outputs the addition result data DA11[15:0], a level of the update signal UPDATE may change from a logic "high(HI)" level into a logic "low(LO)" level. The addition result data DA11[15:0] output from the latch circuit 140 may be output from the multiple operation circuit 100 through the second output line 162. The addition result data DA11[15:0] output from the multiple operation circuit 100 may correspond to the EWA result data EWA(1.1) located at a cross point of the first row R(1) and the first column C(1) of the result matrix 430 illustrated in FIG. 10.

Figure 12:
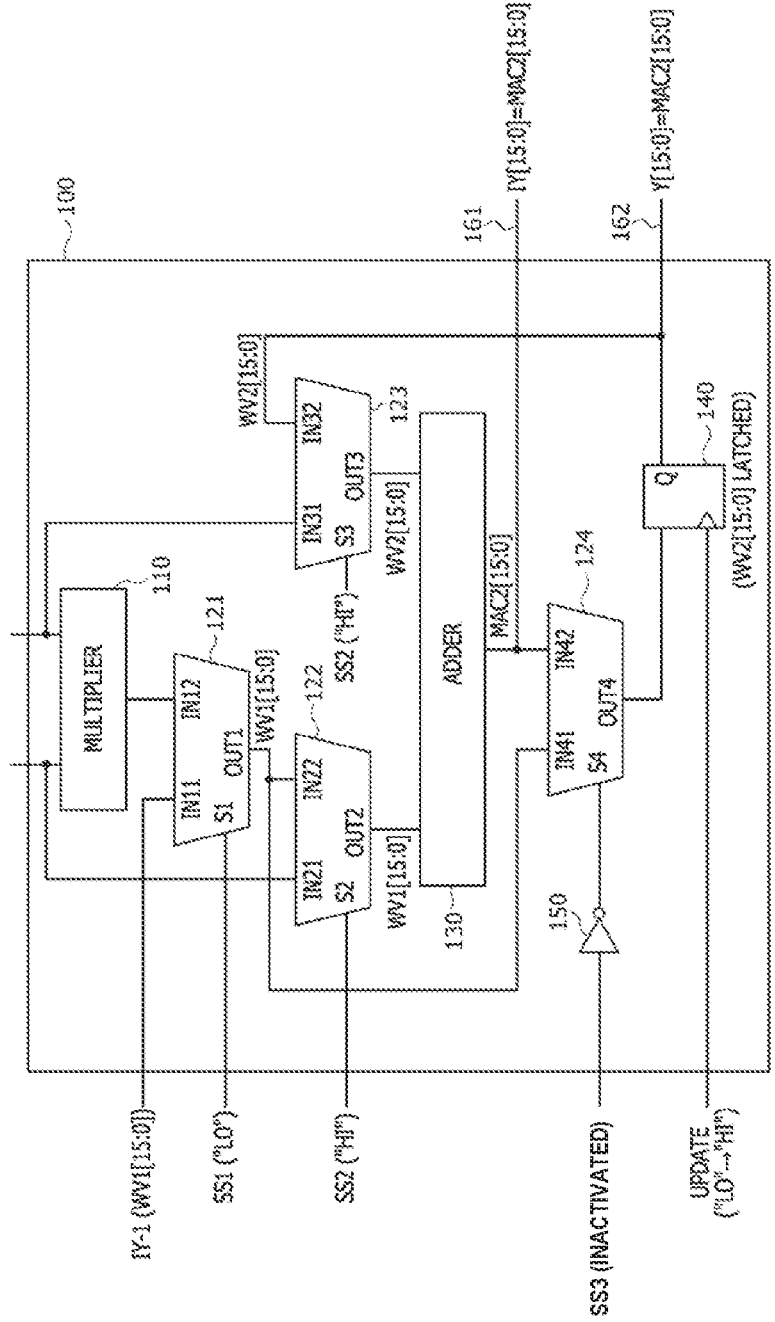
FIG. 12 illustrates an accumulating calculation executed in a third operation mode of the multiple operation circuit illustrated in FIG. 1.

FIG. 12 illustrates the accumulating calculation executed in the third operation mode of the multiple operation circuit 100 illustrated in FIG. 1. In the third operation mode of the multiple operation circuit 100, the accumulating calculation may be performed when certain data are latched in the latch circuit 140. In an embodiment, in order that the certain data are latched by the latch circuit 140, the MAC operation described with reference to FIGS. 6 and 7 may be performed in the first operation mode of the multiple operation circuit 100 in advance. The present embodiment will be described in conjunction with a case that the multiplying calculation of the weight data W(1.2) located at a cross point of the first row RW(1) and the second column CW(2) of the weight matrix 210 illustrated in FIG. 5 and the vector data V(2) in the second row RV(2) of the vector matrix 220 illustrated in FIG. 5 is executed by the MAC operation performed in the first operation mode of the multiple operation circuit 100. Thus, the latch circuit 140 of the multiple operation circuit 100 may have the second multiplication result data WV2 [15:0] which are latched in the latch circuit 140. In addition, it may be assumed that the first result data IY-1 transmitted to the multiple operation circuit 100 are the first multiplication result data WV1[15:0] generated by the multiplying calculation of the weight data W(1.1) located at a cross point of the first row RW(1) and the first column CW(1) of the weight matrix 210 and the vector data V(1) in the first row RV(1) of the vector matrix 220.

Referring to FIG. 12, the multiple operation circuit 100 may receive the first multiplication result data WV1[15:0] corresponding to the first result data IY-1 while the second multiplication result data WV2[15:0] are latched in the latch circuit 140. The multiple operation circuit 100 may also receive the first selection signal SS1 having a logic "low (LO)" level and the second selection signal SS2 having a logic "high(HI)" level. The first selection signal SS1 having a logic "low(LO)" level may be transmitted to the selection terminal S1 of the first selector 121. The second selection signal SS2 having a logic "high(HI)" level may be transmitted to the selection terminal S2 of the second selector 122 and the selection terminal S3 of the third selector 123. The multiple operation circuit 100 may receive the update signal UPDATE, a level of which changes from a logic "low(LO)" level into a logic "high(HI)" level before the second selection signal SS2 is transmitted to the second selector 122 and the third selector 123. The update signal UPDATE may be transmitted to the clock terminal of the latch circuit 140. The third selection signal SS3 may be inactivated so that the fourth selector 124 does not operate.

The first multiplication result data WV1[15:0] corresponding to the first result data IY-1 applied to the multiple operation circuit 100 may be transmitted to the first input terminal IN11 of the first selector 121. The first selector 121 may output the first multiplication result data WV1[15:0] through the output terminal OUT1 in response to the first selection signal SS1 having a logic "low(LO)" level. The first multiplication result data WV1[15:0] output from the first selector 121 may be transmitted to the second input terminal IN22 of the second selector 122. The latch circuit 140 may be synchronized with a rising edge of the update signal UPDATE to output the second multiplication result data WV2[15:0], which are latched in the latch circuit 140, through the output terminal Q. The second multiplication result data WV2[15:0] output from the latch circuit 140 may be fed back to the second input terminal IN32 of the third selector 123. In addition, the second multiplication result data WV2[15:0] output from the latch circuit 140 may be output from the multiple operation circuit 100 to provide the operation result data Y[15:0].

When the second selection signal SS2 having a logic "high(HI)" level is transmitted to the selection terminal S2 of the second selector 122, the second selector 122 may output the first multiplication result data WV1[15:0], which are input to the second input terminal IN22 of the second selector 122, through the output terminal OUT2. The first multiplication result data WV1[15:0] output from the second selector 122 may be transmitted to the first input terminal of the adder 130. When the second selection signal SS2 having a logic "high(HI)" level is transmitted to the selection terminal S3 of the third selector 123, the third selector 123 may output the second multiplication result data WV2[15:0], which are input to the second input terminal IN32 of the third selector 123, through the output terminal OUT3. The second multiplication result data WV2[15:0] output from the third selector 123 may be transmitted to the second input terminal of the adder 130.

The adder 130 may perform an adding calculation for adding the first multiplication result data WV1[15:0] input to the first input terminal of the adder 130 to the second multiplication result data WV2[15:0] input to the second input terminal of the adder 130, thereby generating the second MAC data MAC2[15:0]. The second MAC data MAC2[15:0] generated by the adder 130 may be output from the multiple operation circuit 100 through the first output line 161 to provide the second result data IY[15:0]. As described with reference to FIG. 5, the second MAC data MAC2[15:0] output from the multiple operation circuit 100 through the first output line 161 may have the same value as the data generated by the second MAC operation.

Figure 13:
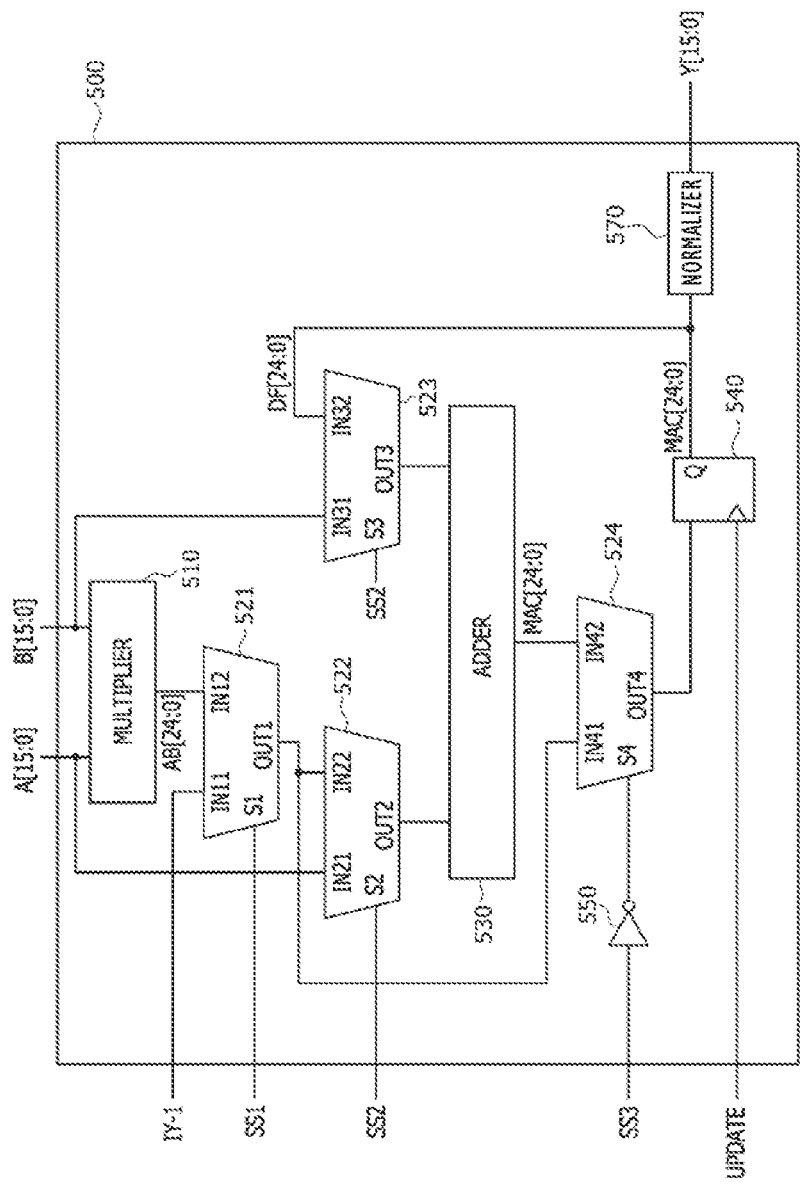
FIG. 13 illustrates a configuration of a multiple operation circuit according to another embodiment of the present disclosure.

FIG. 13 illustrates a configuration of a multiple operation circuit 500 according to another embodiment of the present disclosure. Referring to FIG. 13, the multiple operation circuit 500 may include a multiplier 510, first to fourth selectors 521~524, an adder 530, a latch circuit 540, an inverter 550, and a normalizer 570. The first to fourth selectors 521~524, the adder 530, the latch circuit 540, and the inverter 550 of the multiple operation circuit 500 may have substantially the same configurations as the first to fourth selectors 121~124, the adder 130, the latch circuit 140, and the inverter 150 of the multiple operation circuit 100, which is described with reference to FIG. 1, respectively. Thus, the same descriptions as set forth in the embodiment of FIG. 1 will be omitted hereinafter.

The multiplier 510 may be different from the multiplier 110 described with reference to FIG. 2 in terms of a point that no normalization process is executed by the multiplier 510. Specifically, when the first input data A[15:0] and the second input data B[15:0] having a 16-bit floating-point format are input to the multiple operation circuit 500, the multiplier 510 may perform a multiplying calculation of the first input data A[15:0] and the second input data B[15:0]. The multiplier 510 may generate and output multiplication result data AB[24:0] as a result of the multiplying calculation. Because no normalization process is executed by the multiplier 510, the multiplication result data AB[24:0] output from the multiplier 510 may have a 25-bit floating-point format. Thus, all of the multiplication result data AB[24:0], feedback data DF[24:0] transmitted to the second input terminal IN32 of the third selector 523, and MAC data MAC [24:0] output from the adder 530 and the latch circuit 540 may have a 25-bit floating-point format. The 25-bit MAC data MAC[24:0] may be normalized by the normalizer 570 to have a 16-bit floating-point format, and the normalized MAC data MAC[15:0] having a 16-bit floating-point format may be output from the normalizer 570 to provide 16-bit result data Y[15:0].

Figure 14:
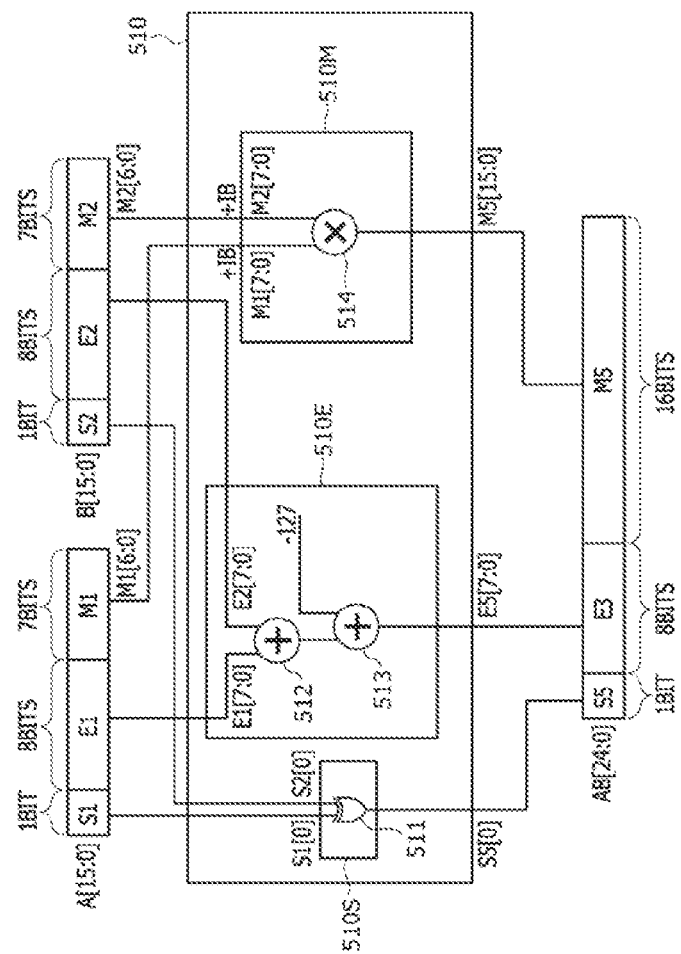
FIG. 14 illustrates an example of a configuration of a multiplier included in the multiple operation circuit illustrated in FIG. 13.

FIG. 14 illustrates an example of a configuration of the multiplier 510 included in the multiple operation circuit 500 illustrated in FIG. 13. In the present embodiment, it may be assumed that the both of the first input data A[15:0] and the second input data B[15:0] have a 16-bit brain floating-point (BF16) format. Thus, the first input data A[15:0] may be comprised of a first sign datum S1[0] having one bit, first exponent data E1[7:0] having 8 bits, and first mantissa data M1[6:0] having 7 bits. In addition, the second input data B[15:0] may be comprised of a second sign datum S2[0] having one bit, second exponent data E2[7:0] having 8 bits, and second mantissa data M2[6:0] having 7 bits. As described with reference to FIG. 13, the multiplication result data AB[24:0] output from the multiplier 510 may have a 25-bit floating-point format. Hereinafter, it may be assumed that the multiplication result data AB[24:0] are comprised of a fifth sign datum S5[0] having one bit, fifth exponent data E5[7:0] having 8 bits, and fifth mantissa data M5[15:0] having 16 bits.

Referring to FIG. 14, the multiplier 510 may include a sign processing circuit 510S, an exponent processing circuit 510E, and a mantissa processing circuit 510M. The sign processing circuit 510S may include an exclusive OR (XOR) gate 511. The XOR gate 511 may receive the first sign datum S1[0] of the first input data A[15:0] and the second sign datum S2[0] of the second input data B[15:0]. When only one of the first sign datum S1[0] and the second sign datum S2[0] has a binary number of "1" meaning a negative number, the XOR gate 511 may output a binary number of "1" meaning a negative number. In contrast, when both of the first sign datum S1[0] and the second sign datum S2[0] have a binary number of "0" meaning a positive number or a binary number of "1" meaning a negative number, the XOR gate 511 may output a binary number of "0" meaning a positive number. The output datum of the XOR gate 511 may correspond to the fifth sign datum S5[0] of the 25-bit multiplication result data AB[24:0].

The exponent processing circuit 510E may include a first exponent adder 512 and a second exponent adder 513. The first exponent adder 512 may receive the first exponent data E1[7:0] of the first input data A[15:0] and the second exponent data E2[7:0] of the second input data B[15:0]. The first exponent adder 512 may add the first exponent data E1[7:0] to the second exponent data E2[7:0] to generate and output addition result data. The first exponent data E1[7:0] may have a value that an exponent bias value corresponding to a decimal number of "127" is added to the original data of the first exponent data E1[7:0], and the second exponent data E2[7:0] may also have a value that an exponent bias value corresponding to a decimal number of "127" is added to the original data of the second exponent data E2[7:0]. Thus, in order to obtain an exponent including the exponent bias value, the second exponent adder 513 may perform an adding calculation for adding a minus exponent bias value corresponding to a decimal number of '−127' to the addition result data output from the first exponent adder 512 to subtract a decimal number of "127" from the addition result data output from the first exponent adder 512. Addition result data output from the second exponent adder 513 may correspond to the fifth exponent data E5[7:0] of the 25-bit multiplication result data AB[24:0].

The mantissa processing circuit 510M may include a mantissa multiplier 514. The mantissa multiplier 514 may receive first mantissa data M1[7:0] of the first input data A[15:0] and second mantissa data M2[7:0] of the second input data B[15:0]. The first mantissa data M1[7:0] may be provided by adding an implied bit IB of "1." to the first mantissa data M1[6:0] to have an 8-bit form of "1.M1[6:0]" and may be input to the mantissa multiplier 514. Similarly, the second mantissa data M2[7:0] may also be provided by adding the implied bit IB of "1." to the second mantissa data M2[6:0] to have an 8-bit form of "1.M2[6:0]" and may be input to the mantissa multiplier 514. The mantissa multiplier 514 may perform a multiplying calculation of the first mantissa data M1[7:0] having 8 bits and the second mantissa data M2[7:0] having 8 bits. The mantissa multiplier 514 may output 16-bit data as a result of the multiplying calculation. The 16-bit data output from the mantissa multiplier 514 may correspond to the fifth mantissa data M5[15:0] having 16 bits included in the multiplication result data AB[24:0] having a 25-bit floating-point format. Because no normalization process is executed by the multiplier 510, the floating-point of the fifth mantissa data M5[15:0] included in the multiplication result data AB[24:0] may be located between the fourteenth bit M5[13] and the fifteenth bit M5[14] of the fifth mantissa data M5[15:0].

Figure 15:
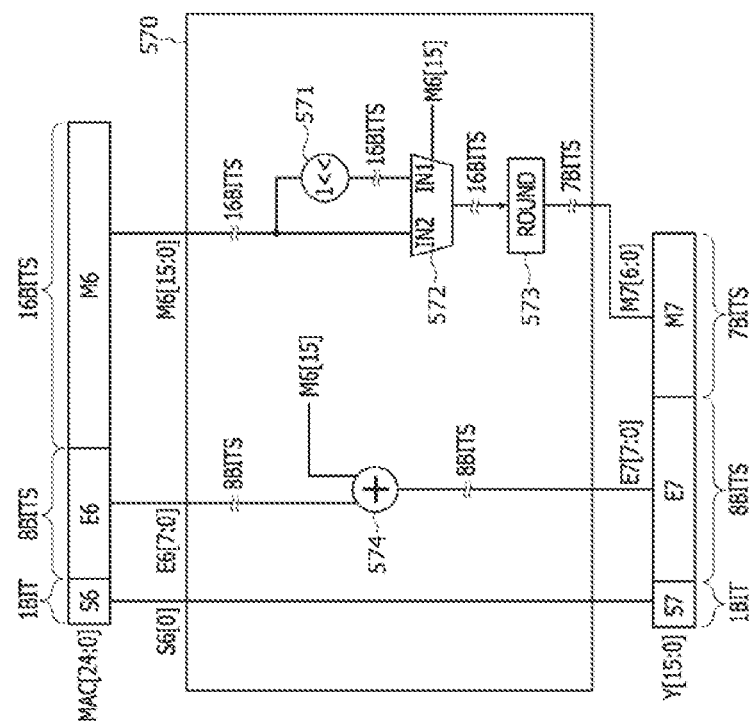
FIG. 15 illustrates an example of a normalizer included in the multiple operation circuit illustrated in FIG. 13.

FIG. 15 illustrates an example of the normalizer 570 included in the multiple operation circuit 500 illustrated in FIG. 13. Referring to FIG. 15, the normalizer 570 may receive the MAC data MAC[24:0] having a 25-bit floating-point format and may normalize the MAC data MAC[24:0]. In the multiple operation circuit 500, the MAC data MAC[24:0] may have the same format as the multiplication result data AB[24:0] output from the multiplier 510. Thus, as described with reference to FIG. 14, the MAC data MAC[24:0] input to the normalizer 570 may be comprised of a sixth sign datum S6[0] having one bit, sixth exponent data E6[7:0] having 8 bits, and sixth mantissa data M6[15:0] having 16 bits. The normalizer 570 may normalize the MAC data MAC[24:0] to generate and output the result data Y[15:0] having a 16-bit brain floating-point (BF16) format. Thus, the result data Y[15:0] output from the normalizer 570 may be comprised of a seventh sign datum S7[0] having one bit, seventh exponent data E7[7:0] having 8 bits, and seventh mantissa data M7[6:0] having 7 bits. In the normalizer 570, no normalization process is applied to the sixth sign datum S6[0] of the MAC data MAC[24:0]. Thus, the sixth sign datum S6[0] may be output from the normalizer 570 without any data change to provide the seventh sign datum S7[0] result data Y[15:0].

The normalizer 570 may include a floating-point shifter 571, a multiplexer 572, a round processor 573, and an adder 574. The floating-point shifter 571 may receive the sixth mantissa data M6[15:0] having 16 bits from the latch circuit (540 of FIG. 13). The floating-point shifter 571 may shift a binary floating-point of the sixth mantissa data M6[15:0] by one bit toward a most significant bit (MSB) of the sixth mantissa data M6[15:0] to generate and output sixth mantissa data having the shifted binary floating-point. Specifically, because the MAC data MAC[24:0] have the same format as the multiplication result data AB[24:0] output from the multiplier 510 as described with reference to FIG. 14, the binary floating-point of the sixth mantissa data M6[15:0] may also be located between the fourteenth bit M6[13] and the fifteenth bit M6[14] of the sixth mantissa data M6[15:0]. Thus, two bits (i.e., the fifteenth bit M6[14] and the MSB M6[15]) including the MSB of the sixth mantissa data M6[15:0] may be located at a left side of the binary floating-point of the sixth mantissa data M6[15:0]. The floating-point shifter 571 may shift the binary floating-point of the sixth mantissa data M6[15:0] such that the binary floating-point of the sixth mantissa data M6[15:0] is located between the fifteenth bit M6[14] and the MSB M6[15] of the sixth mantissa data M6[15:0]. When the MSB M6[15] of the sixth mantissa data M6[15:0] has a binary number of "1", the data generated by the floating-point shifter 571 may have a form of "1.M6[14:0]" including the implied bit. However, when the MSB M6[15] of the sixth mantissa data M6[15:0] has a binary number of "0", the data generated by the floating-point shifter 571 may have a form of "0.M6[14:0]" without the implied bit. The data having the binary floating-point shifted by the floating-point shifter 571 may be transmitted to a first input terminal IN1 of the multiplexer 572.

The multiplexer 572 may receive the data having the binary floating-point shifted by the floating-point shifter 571 through the first input terminal IN1 of the multiplexer 572. In addition, the multiplexer 572 may receive the sixth mantissa data M6[15:0] of the MAC data MAC[24:0] through a second input terminal IN2 of the multiplexer 572. Furthermore, the multiplexer 572 may receive the MSB datum M6[15] of the sixth mantissa data M6[15:0] through a selection terminal of the multiplexer 572. When the MSB M6[15] of the sixth mantissa data M6[15:0] has a binary number of "1" corresponding to a logic "high" level, the multiplexer 572 may output the data (i.e., 16-bit data having a format of "1.M6[14:0]" including the implied bit) input to the first input terminal IN1. When the MSB M6[15] of the sixth mantissa data M6[15:0] has a binary number of "0" corresponding to a logic "low" level, the multiplexer 572 may output the sixth mantissa data M6[15:0] input to the second input terminal IN2. When the MSB M6[15] of the sixth mantissa data M6[15:0] has a binary number of "0", the sixth mantissa data M6[15:0] output from the multiplexer 572 may have a format of "01.M6[13:0]". In such a case, data having a format of "1.M6[14:0]" including the implied bit may be obtained by removing the MSB M6[15] (having a logic "low(0)" level) of the sixth mantissa data M6[15:0] from the sixth mantissa data M6[15:0] having a format of "01.M6[13:0]".

The round processor 573 may receive the 16-bit data from the multiplexer 572. The round processor 573 may remove 9 bits including the implied bit from the 16-bit output from the multiplexer 572 to generate 7-bit data and may perform a rounding operation while the 9 bits including the implied bit are removed from the 16-bit data. During the rounding operation, an adding calculation for adding a value of "1" may be performed by a round-off operation or a round-up operation. The round processor 573 may generate and output the seventh mantissa data M7[6:0] having 7 bits included in the result data Y[15:0] as a result of the operation for adjusting the number of bits and the rounding operation.

The adder 574 may receive the sixth exponent data E6[7:0] having 8 bits of the MAC data MAC[24:0] and the MSB datum M6[15] of the sixth mantissa data M6[15:0]. The adder 574 may perform an adding calculation of the sixth exponent data E6[7:0] and the MSB datum M6[15] of the sixth mantissa data M6[15:0]. When the MSB datum M6[15] of the sixth mantissa data M6[15:0] has a binary number of "0", the adder 574 may output the same data as the sixth exponent data E6[7:0]. When the MSB datum M6[15] of the sixth mantissa data M6[15:0] has a binary number of "1", the adder 574 may output data which are generated by adding one to the sixth exponent data E6[7:0]. As described above, when the MSB datum M6[15] of the sixth mantissa data M6[15:0] has a binary number of "1", the multiplexer 572 may output the data which are generated by shifting a binary floating-point of the sixth mantissa data M6[15:0] by one bit toward a most significant bit (MSB) of the sixth mantissa data M6[15:0]. Thus, in such a case, the exponent change due to the shift of the binary floating-point may be compensated by adding one to the sixth exponent data E6[7:0] input to the adder 574. 8-bit output data of the adder 574 may provide the seventh exponent data E7[7:0] having 8 bits included in the result data Y[15:0].

Figure 16:
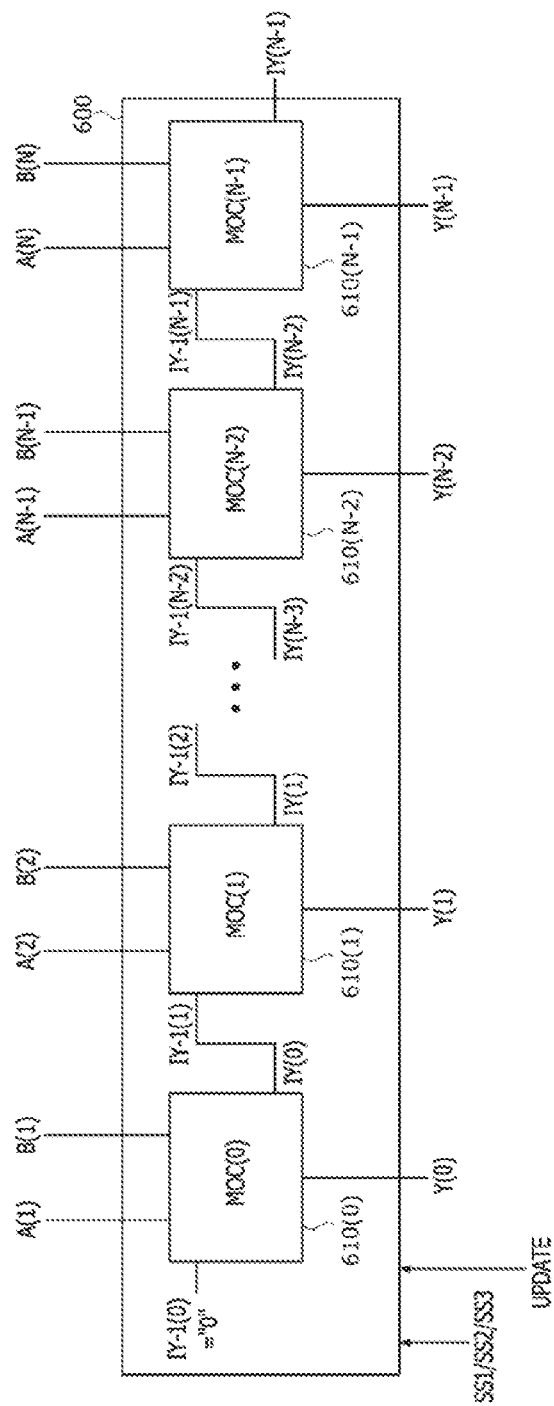
FIG. 16 illustrates a MAC operator according to an embodiment of the present disclosure.

FIG. 16 illustrates a MAC operator 600 according to an embodiment of the present disclosure. Referring to FIG. 16, the MAC operator 600 may receive "N"-number of first input data A(1)~A(N) and "N"-number of second input data B(1)~B(N). The MAC operator 600 may also receive various control signals such as a first selection signal SS1, a second selection signal SS2, a third selection signal SS3, and an update signal UPDATE. The MAC operator 600 may output $N^{th}$ second result data IY(N-1) and "N"-number of operation result data (i.e., first to $N^{th}$ operation result data Y(0)~Y(N-1)).

The MAC operator 600 may include "N"-number of multiple operation circuits (MOC(0)~MOC(N-1)) (i.e., first to $N_{th}$ multiple operation circuits 610(0)~610(N-1)). Each of the first to $N^{th}$ multiple operation circuits 610(0)~610(N-1) constituting the MAC operator 600 may have substantially the same configuration as the multiple operation circuit 100 described with reference to FIG. 1. Thus, the configuration and operation of the multiple operation circuit 100 described with reference to FIG. 1 may be equally applied to each of the first to $N^{th}$ multiple operation circuits 610(0)~610(N-1). Accordingly, the descriptions for the configuration and operation of each of the first to $N^{th}$ multiple operation circuits 610(0)~610(N-1) will be omitted hereinafter to avoid duplicate explanation.

The first to third selection signals SS1, SS2, and SS3 and the update signal UPDATE input to the MAC operator 600 may be transmitted to each of the first to $N^{th}$ multiple operation circuits 610(0)~610(N-1). Meanwhile, the "N"-number of first input data A(1)~A(N) may be transmitted to respective ones of the first to $N^{th}$ multiple operation circuits 610(0)~610(N-1), and the "N"-number of second input data B(1)~B(N) may also be transmitted to respective ones of the first to $N^{th}$ multiple operation circuits 610(0)~610(N-1). For example, the first data A(1) of the first input data A(1)~A(N) and the first data B(1) of the second input data B(1)~B(N) may be transmitted to the first multiple operation circuit 610(0), and the second data A(2) of the first input data A(1)~A(N) and the second data B(2) of the second input data B(1)~B(N) may be transmitted to the second multiple operation circuit 610(1). Similarly, the $N^{th}$ data A(N) of the first input data A(1)~A(N) and the $N^{th}$ data B(N) of the second input data B(1)~B(N) may be transmitted to the $N^{th}$ multiple operation circuit 610(N-1). The first input data A(1)~A(N) and the second input data B(1)~B(N) may have different data formats according to calculations which are executed using the first input data A(1)~A(N) and the second input data B(1)~B(N) as input data, as described with reference to FIG. 1.

Each of the first to $N^{th}$ multiple operation circuits 610(0)~610(N-1) may receive the first result data IY-1 to generate and output the second result data IY. For example, the first multiple operation circuit 610(0) may receive first data IY-1(0) of the first result data IY-1 to generate and output first data IY(0) of the second result data IY. The first multiple operation circuit 610(0) corresponds to a foremost one of the first to $N^{th}$ multiple operation circuits 610(0)~610(N-1). In an embodiment, the first data IY-1(0) of the first result data IY-1, which are input to the first multiple operation circuit 610(0), may be fixed to have a value of "0". In another embodiment, the first data IY-1(0) of the first result data IY-1, which are input to the first multiple operation circuit 610(0), may be provided by an external device coupled to the MAC operator 600 whenever the first multiple operation circuit 610(0) requests the first data IY-1(0). The second multiple operation circuit 610(1) may receive second data IY-1(1) of the first result data IY-1 to generate and output second data IY(1) of the second result data IY. Similarly, the $N^{th}$ multiple operation circuit 610(N-1) may receive $N^{th}$ data IY-1(N-1) of the first result data IY-1 to generate and output $N^{th}$ data IY(N-1) of the second result data IY. The $N^{th}$ data IY(N-1) of the second result data IY output from the $N^{th}$ multiple operation circuit 610(N-1) may be output from the MAC operator 600. The $N^{th}$ multiple operation circuit 610(N-1) corresponds to a last one of the first to $N^{th}$ multiple operation circuits 610(0)~610(N-1).

The first to $N^{th}$ operation result data Y(0)~Y(N-1) output from the MAC operator 600 may be output from the first to $N^{th}$ multiple operation circuits 610(0)~610(N-1), respectively. That is, the operation result data Y generated by the first to $N^{th}$ multiple operation circuits 610(0)~610(N-1) may be output from the MAC operator 600. The first multiple operation circuit 610(0) may output the first operation result data Y(0), and the second multiple operation circuit 610(1) may output the second operation result data Y(1). Similarly, the $N^{th}$ multiple operation circuit 610(N-1) may output the $N^{th}$ operation result data Y(N-1).

The first to $N^{th}$ multiple operation circuits 610(0)~610(N-1) may be disposed in series such that an output line of an $(i-1)^{th}$ multiple operation circuit is coupled to an input line of an $i^{th}$ multiple operation circuit (where, "i" is one of the natural numbers from "1" to "N"). Thus, the second result data IY output from the $(i-1)^{th}$ multiple operation circuit may be the first result data IY-1 input to the $i^{th}$ multiple operation circuit. Specifically, the first data IY(0) of the second result data IY output through the output line of the first operation circuit 610(0) may correspond to the second data IY-1(1) of the first result data IY-1 input to the second operation circuit 610(1) through the input line of the second operation circuit 610(1). In addition, the second data IY(1) of the second result data IY output through the output line of the second operation circuit 610(1) may correspond to the third data IY-1(2) of the first result data IY-1 input to the third operation circuit (omitted in FIG. 16) through the input line of the third operation circuit.

The $(N-2)^{th}$ data IY(N-3) of the second result data IY output through the output line of the $(N-2)^{th}$ operation circuit (omitted in FIG. 16) may correspond to the $(N-1)^{th}$ data IY-1(N-2) of the first result data IY-1 input to the $(N-1)^{th}$ operation circuit 610(N-2) through the input line of the $(N-1)^{th}$ operation circuit 610(N-2). In addition, the $(N-1)^{th}$ data IY(N-2) of the second result data IY output through the output line of the $(N-1)^{th}$ operation circuit 610(N-2) may correspond to the $N^{th}$ data IY-1(N-1) of the first result data IY-1 input to the $N^{th}$ operation circuit 610(N-1) through the input line of the $N^{th}$ operation circuit 610(N-1). The $N^{th}$ data IY(N-1) of the second result data IY output through the output line of the $N^{th}$ operation circuit 610(N-1) may be output from the MAC operator 600.

The MAC operator 600 may selectively perform the MAC operation in the first operation mode, the EW multiplying calculation and the EW adding calculation in the second operation mode, or the accumulative adding calculation in the third operation mode. The operation or the calculation performed by the MAC operator 600 may be selected by the first selection signal SS1, the second selection signal SS2, the third selection signal SS3, and the update signal UPDATE. When the first and second selection signals SS1 and SS2 having a logic "high(HI)" level and the third selection signal SS3 having a logic "low(LO)" level are transmitted to the MAC operator 600, the MAC operator 600 may perform the MAC operation in the first operation mode like the multiple operation circuit 100 described with reference to FIGS. 6 and 7.

When the first and third selection signals SS1 and SS3 having a logic "high(HI)" level are transmitted to the MAC operator 600 and the second selection signal SS2 is inactivated, the MAC operator 600 may perform the EW multiplying calculation in the second operation mode like the multiple operation circuit 100 described with reference to FIG. 9. When the second and third selection signals SS2 and SS3 having a logic "low(LO)" level are transmitted to the MAC operator 600 and the first selection signal SS1 is inactivated, the MAC operator 600 may perform the EW adding calculation in the second operation mode like the multiple operation circuit 100 described with reference to FIG. 11. In addition, when the first selection signal SS1 having a logic "low(LO)" level and the second selection signal SS2 having a logic "high(HI)" level are transmitted to the MAC operator 600 and the third selection signal SS3 is inactivated, the MAC operator 600 may perform the accumulative adding calculation in the third operation mode like the multiple operation circuit 100 described with reference to FIG. 12.

When the MAC operator 600 performs the MAC operation in the first operation mode, the MAC operation may be performed in a first MAC operation mode or a second MAC operation mode. The MAC operation in the first MAC operation mode or the MAC operation in the second MAC operation mode may be selected according to a way that weight data and vector data are input to the first to $N^{th}$ multiple operation circuits 610(0)~610(N−1). When the MAC operator 600 performs the MAC operation in the first MAC operation mode, the MAC operator 600 may output the MAC result data MAC_RST located in one of the rows of the result matrix 230 illustrated in FIG. 4. In such a case, the $N^{th}$ data IY(N−1) of the second result data IY output from the $N^{th}$ multiple operation circuit 610(N−1) may correspond to the MAC result data MAC_RST. When the MAC operator 600 performs the MAC operation in the second MAC operation mode, the MAC operator 600 may output plural sets of MAC result data (e.g., the first to $M^{th}$ MAC result data MAC_RST(1)~MAC_RST(M)) of the result matrix 230 illustrated in FIG. 4. In such a case, the first to $N^{th}$ operation result data Y(0)~Y(N−1) output from respective ones of the first to $N^{th}$ multiple operation circuit 610 (0)~610(N−1) may correspond to the first to $M^{th}$ MAC result data MAC_RST(1)~MAC_RST(M), respectively. Any one of the first to $M^{th}$ MAC result data MAC_RST(1) ~MAC_RST(M) may be data which are generated by the matrix-vector multiplying calculation that is performed using the weight data arrayed in any one row of the weight matrix and the vector data of the vector matrix as input data.

Figure 17:
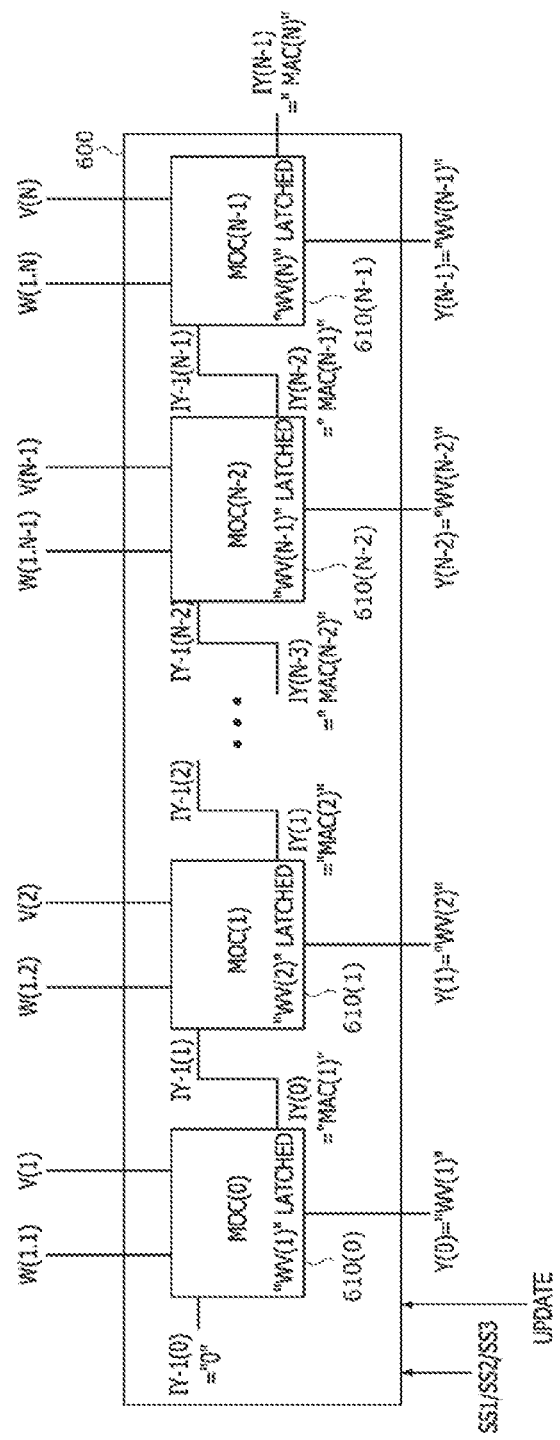
FIG. 17 illustrates a MAC operation performed in a first MAC operation mode of the MAC operator illustrated in FIG. 16.

FIG. 17 illustrates a MAC operation performed in the first MAC operation mode of the MAC operator 600 illustrated in FIG. 16. In FIG. 17, the same reference to numerals or symbols as used in FIG. 16 denote the same elements. The present embodiment will be described in conjunction with the MAC operation that is performed using the weight data W(1.1)~W(1.N) in the first row RW(1) of the weight matrix 210 and the vector data V(1)~V(N) of the vector matrix 220 as input data to generate the first MAC result data MAC_RST(1) in the first row RR(1) of the result matrix 230, in the matrix-vector multiplying calculation described with reference to FIG. 4. The MAC operation according to the present embodiment may be equally applied to the MAC operation for generating each of the second to $M^{th}$ MAC result data MAC_RST(2)~MAC_RST(M) of the result matrix 230. The first to $N^{th}$ multiple operation circuits 610(0)~610(N−1) may sequentially perform the MAC operation in the first operation mode and the accumulative adding calculation in the third operation mode, thereby performing the MAC operation in the first MAC operation mode of the MAC operator 600.

Referring to FIG. 17, the MAC operator 600 may receive the weight data W(1.1)~W(1.N) in the first row CR(1) of the weight matrix 210 and the vector data V(1)~V(N) of the vector matrix 220. In order that the MAC operator 600 performs the MAC operation in the first MAC operation mode, the "N" sets of weight data W(1.1)~W(1.N) may be transmitted to respective ones of the first to $N^{th}$ multiple operation circuits 610(0)~610(N−1). The "N" sets of vector data V(1)~V(N) may also be transmitted to the first to $N^{th}$ multiple operation circuits 610(0)~610(N−1), respectively. For example, the weight data W(1.1) located at a cross point of the first row RW(1) and the first column CW(1) of the weight matrix 210 and the vector data V(1) in the first row RV(1) of the vector matrix 220 may be transmitted to the first multiple operation circuit 610(0). In addition, the weight data W(1.2) located at a cross point of the first row RW(1) and the second column CW(2) of the weight matrix 210 and the vector data V(2) in the second row RV(2) of the vector matrix 220 may be transmitted to the second multiple operation circuit 610(1). Similarly, the weight data W(1.N) located at a cross point of the first row RW(1) and the $N^{th}$ column CW(N) of the weight matrix 210 and the vector data V(N) in the $N^{th}$ row RV(N) of the vector matrix 220 may be transmitted to the $N^{th}$ multiple operation circuit 610(N−1).

First, the first and second selection signals SS1 and SS2 having a logic "high(HI)" level, the third selection signal SS3 having a logic "low(LO)" level, and the update signal UPDATE for a latch operation may be transmitted to the MAC operator 600 such that the first to $N^{th}$ multiple operation circuits 610(0)~610(N−1) of the MAC operator 600 perform the MAC operation in the first operation mode. The first multiple operation circuit 610(0) may perform a multiplying calculation of the weight data W(1.1) and the vector data V(1) to generate the first multiplication result data WV(1), as described with reference to FIG. 6. The first multiple operation circuit 610(0) may latch the first multiplication result data WV(1) in the latch circuit (140 of FIG. 6) included in the first multiple operation circuit 610(0).

Substantially the same operation as the MAC operation performed in the first operation mode of the first multiple operation circuit 610(0) may be performed in each of the second to $N^{th}$ multiple operation circuits 610(1)~610(N−1). Accordingly, the second multiple operation circuit 610(1) may perform a multiplying calculation of the weight data W(1.2) and the vector data V(2) to generate second multiplication result data WV(2) and may latch the second multiplication result data WV(2) in the latch circuit (140 of FIG. 6) included in the second multiple operation circuit 610(1). In addition, the (N−1)$^{th}$ multiple operation circuit 610(N−2) may perform a multiplying calculation of the weight data W(1.(N−1)) and the vector data V(N−1) to generate (N−1)$^{th}$ multiplication result data WV(N−1) and may latch the (N−1)$^{th}$ multiplication result data WV(N−1) in the latch circuit (140 of FIG. 6) included in the (N−1)$^{th}$ multiple operation circuit 610(N−2). Similarly, the N$^{th}$ multiple operation circuit 610(N−1) may perform a multiplying calculation of the weight data W(1.N) and the vector data V(N) to generate N$^{th}$ multiplication result data WV(N) and may latch the N$^{th}$ multiplication result data WV(N) in the latch circuit (140 of FIG. 6) included in the N$^{th}$ multiple operation circuit 610(N−1).

Next, the first selection signal SS1 having a logic "low (LO)" level, the second selection signal SS2 having a logic "high(HI)" level, and the update signal UPDATE for a latch operation may be transmitted to the MAC operator 600 while the third selection signal SS3 is inactivated. As a result, the first to N$^{th}$ multiple operation circuits 610(0)~610(N−1) of the MAC operator 600 may perform the accumulative adding calculation in the third operation mode. The first multiple operation circuit 610(0) may receive the first result data IY-1(0) having a value of zero. The first multiple operation circuit 610(0) may perform an adding calculation of the first result data IY-1(0) having a value of zero and the first multiplication result data WV(1) latched in the first multiple operation circuit 610(0) to generate first MAC data MAC(1) and may output the first MAC data MAC(1) as the first data IY(0) of the second result data IY.

The second multiple operation circuit 610(1) may receive the first MAC data MAC(1), which are output from the first multiple operation circuit 610(0), as the second data IY-1(1) of the first result data IY-1. The second multiple operation circuit 610(1) may perform an adding calculation of the first MAC data MAC(1) and the second multiplication result data WV(2) latched in the second multiple operation circuit 610(1) to generate second MAC data MAC(2) and may output the second MAC data MAC(2) as the second data IY(1) of the second result data IY.

The (N−1)$^{th}$ multiple operation circuit 610(N−2) may receive (N−2)$^{th}$ MAC data MAC(N−2), which are output from the (N−2)$^{th}$ multiple operation circuit (omitted in FIG. 17), as the (N−1)$^{th}$ data IY-1(N−2) of the first result data IY-1. The (N−1)$^{th}$ multiple operation circuit 610(N−2) may perform an adding calculation of the (N−2)$^{th}$ MAC data MAC(N−2) and the (N−1)$^{th}$ multiplication result data WV(N−1) latched in the (N−1)$^{th}$ multiple operation circuit 610(N−2) to generate (N−1)$^{th}$ MAC data MAC(N−1) and may output the (N−1)$^{th}$ MAC data MAC(N−1) as the (N−1)$^{th}$ data IY(N−2) of the second result data IY.

The N$^{th}$ multiple operation circuit 610(N−1) may receive (N−1)$^{th}$ MAC data MAC(N−1), which are output from the (N−1)$^{th}$ multiple operation circuit 610(N−2), as the N$^{th}$ data IY-1(N−1) of the first result data IY-1. The N$^{th}$ multiple operation circuit 610(N−1) may perform an adding calculation of the (N−1)$^{th}$ MAC data MAC(N−1) and the N$^{th}$ multiplication result data WV(N) latched in the N$^{th}$ multiple operation circuit 610(N−1) to generate N$^{th}$ MAC data MAC(N) and may output the N$^{th}$ MAC data MAC(N) as the N$^{th}$ data IY(N−1) of the second result data IY. The N$^{th}$ MAC data MAC(N) corresponding to the N$^{th}$ data IY(N−1) of the second result data IY, which are output from the N$^{th}$ multiple operation circuit 610(N−1), may be the first MAC result data MAC_RST(1) which are generated by the matrix-vector multiplying calculation of the weight data W(1.1)~W(1.N) in the first row RW(1) of the weight matrix 210 and the vector data V(1)~V(N) of the vector matrix 220, as described with reference to FIGS. 4 and 5.

Figure 18:
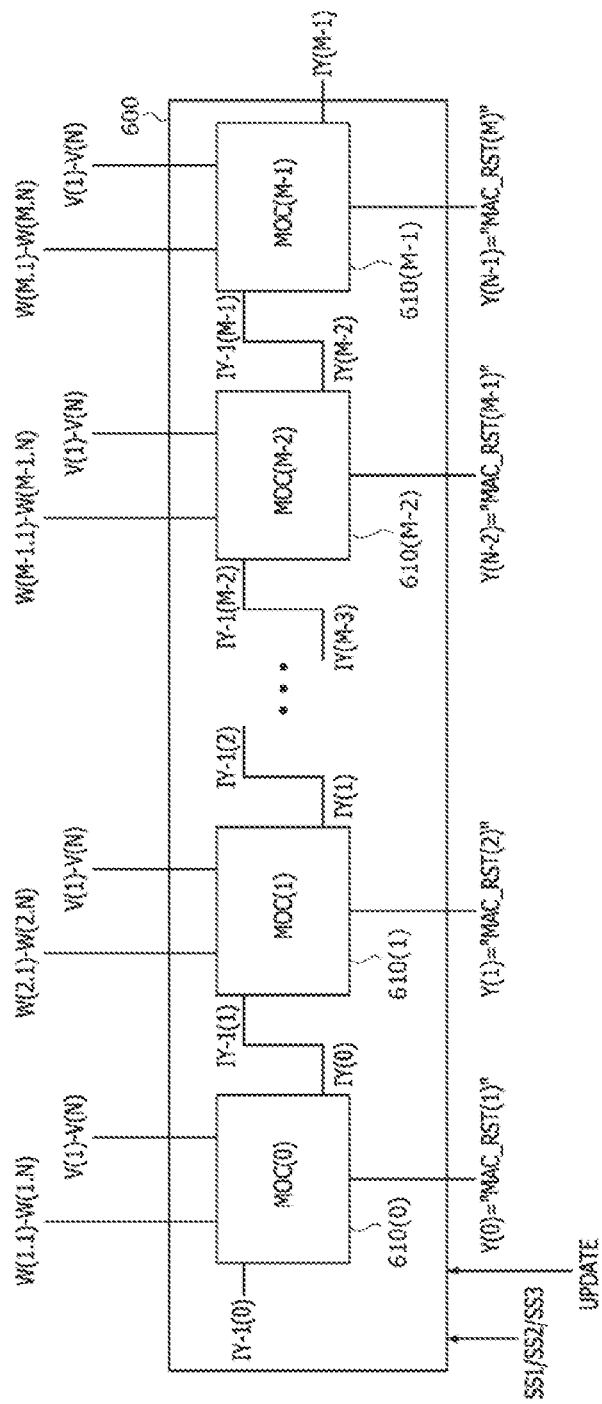
FIG. 18 illustrates a MAC operation performed in a second MAC operation mode of the MAC operator illustrated in FIG. 16.

FIG. 18 illustrates a MAC operation performed in the second MAC operation mode of the MAC operator 600 illustrated in FIG. 16. In FIG. 18, the same reference numerals or symbols as used in FIG. 16 denote the same elements. The present embodiment will be described in conjunction with the MAC operation that is performed using the weight matrix 210 and the vector matrix 220 as input data to generate the result matrix 230, in the matrix-vector multiplying calculation described with reference to FIG. 4. In such a case, it may be assumed that the MAC operator 600 includes the same number of multiple operation circuits 610(0)~610(M−1) as the rows RWs of the weight matrix 210. That is, the number of the multiple operation circuits 610(0)~610(M−1) may be equal to the number of the rows of the weight matrix 210. Each of the first to M$^{th}$ multiple operation circuits 610(0)~610(M−1) may iteratively perform the MAC operation in the first operation mode by the same number of times as the number of the columns CWs of the weight matrix 210 (corresponding to the number of the rows RVs of the vector matrix 220), thereby performing the MAC operation in the second MAC operation mode of the MAC operator 600.

Referring to FIG. 18, the MAC operator 600 may sequentially receive the weight data W(1.1)~W(1.N), . . . , and W(M.1)~W(M.N) arrayed in all of the rows RW(1)~RW(M) of the weight matrix 210 and the vector data V(1)~V(N) of the vector matrix 220. In order that the MAC operator 600 performs the MAC operation in the second MAC operation mode, the "N" sets of weight data Ws arrayed in one of the rows of the weight matrix 210 may be sequentially transmitted to one of the first to M$^{th}$ multiple operation circuits 610(0)~610(M−1) and the "N" sets of vector data V(1)~V(N) of the vector matrix 220 may also be sequentially transmitted to the one of the first to M$^{th}$ multiple operation circuits 610(0)~610(M−1). For example, the weight data W(1.1)~W(1.N) arrayed in the first row RW(1) of the weight matrix 210 may be sequentially transmitted to the first multiple operation circuit 610(0), and the vector data V(1)~V(N) of the vector matrix 220 may also be sequentially transmitted to the first multiple operation circuit 610(0). In addition, the weight data W(2.1)~W(2.N) arrayed in the second row RW(2) of the weight matrix 210 may be sequentially transmitted to the second multiple operation circuit 610(1), and the vector data V(1)~V(N) of the vector matrix 220 may also be sequentially transmitted to the second multiple operation circuit 610(1). Similarly, the weight data W((M−1).1)~W((M−1).N) arrayed in the (M−1)$^{th}$ row RW(M−1) of the weight matrix 210 may be sequentially transmitted to the (M−1)$^{th}$ multiple operation circuit 610(M−2), and the vector data V(1)~V(N) of the vector matrix 220 may also be sequentially transmitted to the (M−1)$^{th}$ multiple operation circuit 610(M−2). Finally, the weight data W(M.1)~W(M.N) arrayed in the M$^{th}$ row RW(M) of the weight matrix 210 may be sequentially transmitted to the M$^{th}$ multiple operation circuit 610(M−1), and the vector data V(1)~V(N) of the vector matrix 220 may also be sequentially transmitted to the M$^{th}$ multiple operation circuit 610(M−1).

First, the first and second selection signals SS1 and SS2 having a logic "high(HI)" level, the third selection signal SS3 having a logic "low(LO)" level, and the update signal UPDATE for a latch operation may be transmitted to the MAC operator 600 such that the first to M$^{th}$ multiple operation circuits 610(0)~610(M−1) of the MAC operator 600 perform the MAC operation in the first operation mode. When the weight data W(1.1), W(2.1), . . . , W((M−1).1), and W(M.1) arrayed in the first column CW(1) of the weight matrix 210 are transmitted to respective ones of the first to $M^{th}$ multiple operation circuits 610(0)~610(M-1) and the vector data V(1) in the first row RV(1) of the vector matrix 220 are transmitted to each of the first to $M^{th}$ multiple operation circuits 610(0)~610(M-1), each of the first to $M^{th}$ multiple operation circuits 610(0)~610(M-1) may perform the first MAC operation in the first operation mode. The first MAC operation performed in the first operation mode may be the same as the first MAC operation described with reference to FIGS. 5 and 6. Each of the multiple operation circuits 610(0)~610(M-1) may perform the first MAC operation in the first operation mode to generate the first MAC data MAC1[15:0] of one of the rows of the weigh matrix 210. The "M" sets of the first MAC data MAC1[15:0] generated by the multiple operation circuits 610(0)~610(M-1) may be latched in the latch circuits included in respective ones of the multiple operation circuits 610(0)~610(M-1).

Next, when the weight data W(1.2), W(2.2), ..., W((M-1).2), and W(M.2) arrayed in the second column CW(2) of the weight matrix 210 are transmitted to respective ones of the first to $M^{th}$ multiple operation circuits 610(0)~610(M-1) and the vector data V(2) in the second row RV(2) of the vector matrix 220 are transmitted to each of the first to $M^{th}$ multiple operation circuits 610(0)~610(M-1), each of the first to $M^{th}$ multiple operation circuits 610(0)~610(M-1) may perform the second MAC operation in the first operation mode. The second MAC operation performed in the first operation mode may be the same as the second MAC operation described with reference to FIGS. 5 and 7. Each of the multiple operation circuits 610(0)~610(M-1) may perform the second MAC operation in the first operation mode to generate the second MAC data MAC2[15:0] of one of the rows of the weigh matrix 210. The "M" sets of the second MAC data MAC2[15:0] generated by the multiple operation circuits 610(0)~610(M-1) may be latched in the latch circuits included in respective ones of the multiple operation circuits 610(0)~610(M-1). Subsequently, when the weight data W(1.3), W(2.3), ..., W((M-1).3), and W(M.3) arrayed in the third column CW(3) of the weight matrix 210 are transmitted to respective ones of the first to $M^{th}$ multiple operation circuits 610(0)~610(M-1) and the vector data V(3) in the third row RV(3) of the vector matrix 220 are transmitted to each of the first to $M^{th}$ multiple operation circuits 610(0)~610(M-1), each of the first to $M^{th}$ multiple operation circuits 610(0)~610(M-1) may perform the third MAC operation in the first operation mode. The third MAC operation in the first operation mode may also be performed in substantially the same way as described with reference to FIGS. 5 and 7. Each of the multiple operation circuits 610(0)~610(M-1) may perform the third MAC operation in the first operation mode to generate the third MAC data MAC3[15:0] of one of the rows of the weigh matrix 210. The "M" sets of the third MAC data MAC3[15:0] generated by the multiple operation circuits 610(0)~610(M-1) may be latched in the latch circuits included in respective ones of the multiple operation circuits 610(0)~610(M-1).

Using the same way as described above, each of the multiple operation circuits 610(0)~610(M-1) may sequentially perform fourth to $N^{th}$ MAC operations in the first operation mode to sequentially generate fourth to $N^{th}$ MAC data MAC4[15:0]~MAC(N)[15:0] of one of the rows of the weigh matrix 210. The "M" sets of $N^{th}$ MAC data MAC(N)[15:0] generated by respective ones of the first to $M^{th}$ multiple operation circuits 610(0)~610(M-1) may correspond to the first to $M^{th}$ MAC result data MAC_RST(1)~MAC_RST(M) of the result matrix 230 illustrated in FIG. 5, respectively. That is, the first multiple operation circuit 610(0) may output the $N^{th}$ MAC data MAC(N)[15:0], which are generated by the first to $N^{th}$ MAC operations for the weight data W(1.1)~W(1.N) arrayed in the first row of the weight matrix 210 and the vector data V(1)~V(N) of the vector matrix 220, as the first MAC result data MAC_RST(1). In addition, the second multiple operation circuit 610(1) may output the $N^{th}$ MAC data MAC(N)[15:0], which are generated by the first to $N^{th}$ MAC operations for the weight data W(2.1)~W(2.N) arrayed in the second row of the weight matrix 210 and the vector data V(1)~V(N) of the vector matrix 220, as the second MAC result data MAC_RST(2). Similarly, the $(M-1)^{th}$ multiple operation circuit 610(M-2) may output the $N^{th}$ MAC data MAC(N)[15:0], which are generated by the first to $N^{th}$ MAC operations for the weight data W((M-1).1)~W((M-1).N) arrayed in the $(M-1)^{th}$ row of the weight matrix 210 and the vector data V(1)~V(N) of the vector matrix 220, as the $(M-1)^{th}$ MAC result data MAC_RST(M-1). Finally, the $M^{th}$ multiple operation circuit 610(M-1) may output the $N^{th}$ MAC data MAC(N)[15:0], which are generated by the first to $N^{th}$ MAC operations for the weight data W(M.1)~W(M.N) arrayed in the $M^{th}$ row of the weight matrix 210 and the vector data V(1)~V(N) of the vector matrix 220, as the $M^{th}$ MAC result data MAC_RST(M).

Figure 19:
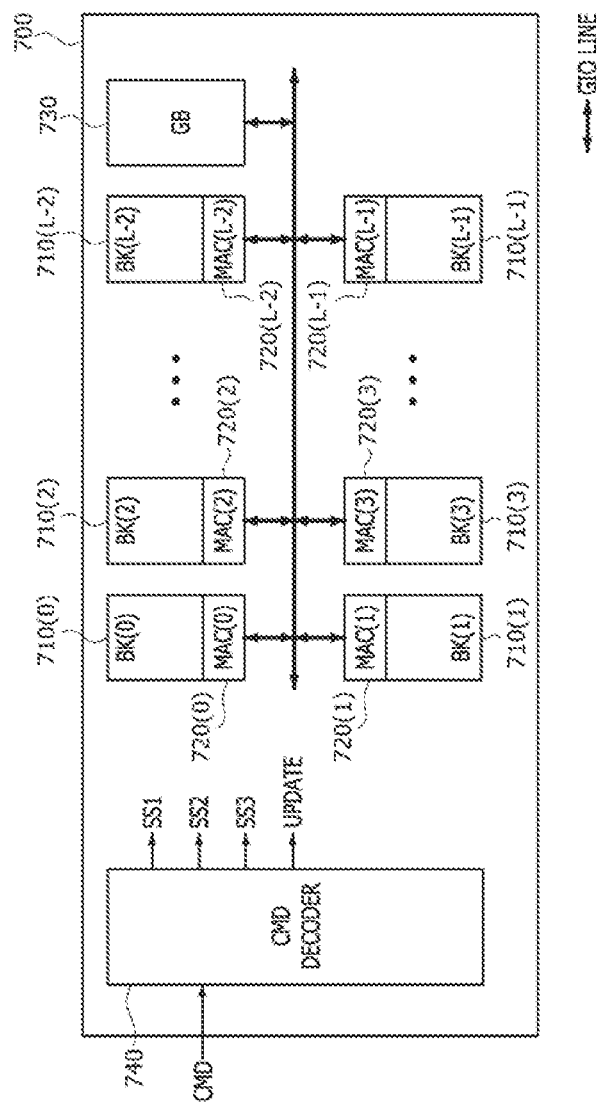
FIG. 19 illustrates a processing-in-memory (PIM) device according to an embodiment of the present disclosure.

FIG. 19 illustrates a PIM device 700 according to an embodiment of the present disclosure. Referring to FIG. 19, the PIM device 700 may include "L"-number of memory banks BK(0)~BK(L-1) (i.e., first to L memory banks 710(0)~710(L-1)), "L"-number of MAC operators MAC(0)~MAC(L-1) (i.e., first to $L^{th}$ MAC operators 720(0)~720(L-1)), a global buffer (GB) 730, and a command decoder 740 (where, "L" is a natural number which is equal to or greater than two). In an embodiment, each of the memory banks 710(0)~710(L-1) may constitute one MAC unit with any one of the MAC operators 720(0)~720(L-1). The MAC operator MAC of a certain MAC unit may receive the weigh data from the memory bank of the certain MAC unit. For example, the first memory bank 710(0) and the first MAC operator 720(0) may constitute a first MAC unit. In such a case, the first MAC operator 720(0) may receive the weight data from the first memory bank 710(0). A configuration and an operation of each of the MAC operators 720(0)~720(L-1) may be the same as the configuration and the operation of the MAC operator 600 described with reference to FIGS. 16 an 17. In such a case, each of the MAC operators 720(0)~720(L-1) included in the PIM device 700 may perform the same MAC operation in the first MAC operation mode as described with reference to FIG. 17.

The global buffer 730 may be configured to transmit the vector data used for the MAC operation to the MAC operators 720(0)~720(L-1). In order that the global buffer 730 transmits the vector data to the MAC operators 720(0)~720(L-1), the global buffer 730 may receive the vector data from a controller (not shown) to store the vector data therein in response to a request output from a host (not shown). In an embodiment, the global buffer 730 may transmit the vector data to the MAC operators 720(0)~720(L-1) through a global input/output (I/O) line GIO. The vector data output from the global buffer 730 may be transmitted to each of the MAC operators 720(0)~720(L-1).

The command decoder 740 may receive a command CMD from an external device, for example, a controller. The command decoder 740 may decode the command CMD to generate and output control signal such as a first selection signal SS1, a second selection signal SS2, a third selection signal SS3, and an update signal UPDATE. Although not shown in FIG. 19, the command decoder 740 may also output additional control signals such as a read signal and a write signal for accessing to the memory banks 710(0)~710(L−1) and the global buffer 730. As described with reference to FIGS. 16 to 18, the first to third selection signals SS1~SS3 and the update signal UPDATE may control a plurality of arithmetic operations or calculations of the MAC operators 720(0)~720(L−1).

Figure 20:
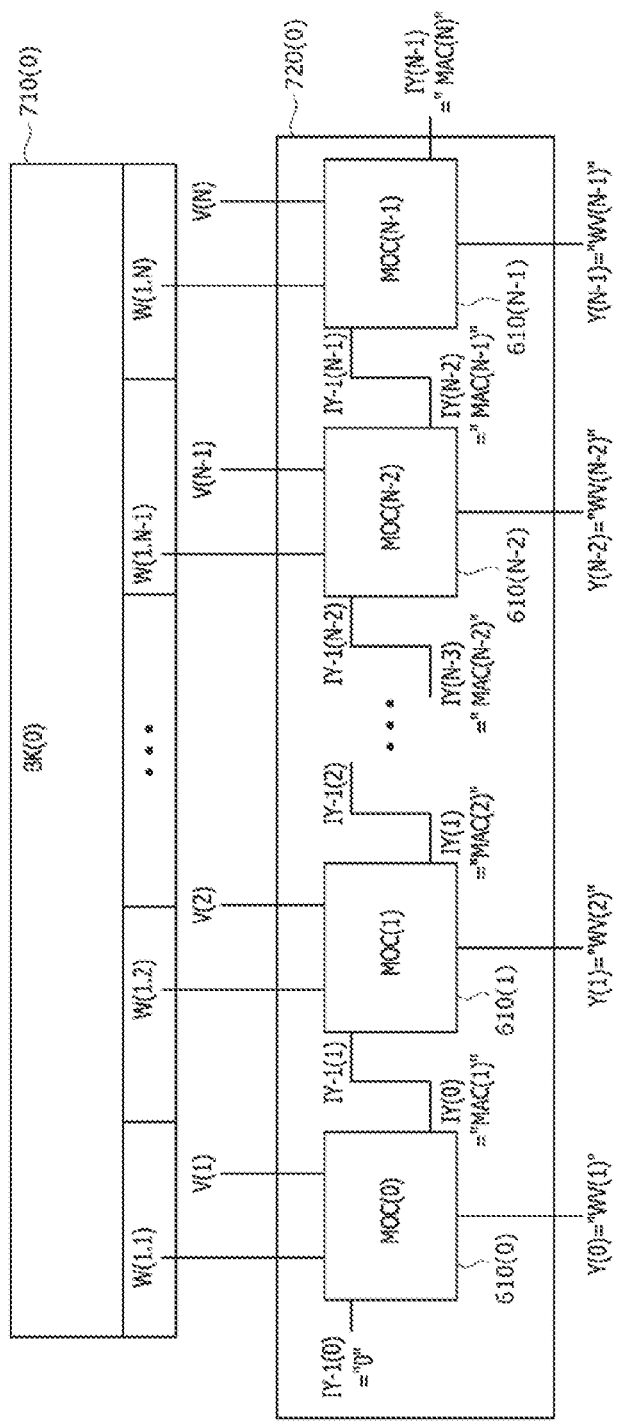
FIG. 20 illustrates an example of a MAC operation performed by the PIM device illustrated in FIG. 19.

FIG. 20 illustrates an example of the MAC operation performed by the PIM device 700 illustrated in FIG. 19. As described with reference to FIG. 19, the MAC operators 720(0)~720(L−1) of the PIM device 700 may perform the MAC operation in the first MAC operation mode which is described with reference to FIG. 17. The present embodiment will be described in conjunction with the MAC operation performed by the first MAC operator 720(0) and the first memory bank 710(0). The following description of the MAC operation according to the present embodiment may be equally applied to the MAC operation of each of the second to $L^{th}$ MAC operators 720(1)~720(L−1).

Referring to FIG. 20, the first MAC operator 720(0) may include "N"-number of multiple operation circuits (i.e., first to $N^{th}$ multiple operation circuits 610(0)~610(N−1)). The first MAC operator 720(0) may receive the weight data W(1.1)~W(1.N) from the first memory bank 710(0) to perform the MAC operation. In addition, the first MAC operator 720(0) may receive the vector data V(1)~V(N) from the global buffer (730 of FIG. 19). The "N" sets of weight data W(1.1)~W(1.N) output from the first memory bank 710(0) may be transmitted to the first to $N^{th}$ multiple operation circuits 610(0)~610(N−1) of the first MAC operator 720(0), respectively. The "N" sets of vector data V(1)~V(N) output from the global buffer (730 of FIG. 19) may also be transmitted to the first to $N^{th}$ multiple operation circuits 610(0)~610(N−1) of the first MAC operator 720(0), respectively. The first MAC operator 720(0) may perform the MAC operation in the first MAC operation mode. As described with reference to FIG. 17, the first MAC operator 720(0) may perform the MAC operation in the first MAC operation mode to output the $N^{th}$ MAC data MAC(N), which are generated by the $N^{th}$ multiple operation circuit 610(N−1), as the $N^{th}$ data IY(N−1) of the second result data IY. The $N^{th}$ MAC data MAC(N) output from the first MAC operator 720(0) may correspond to the first MAC result data MAC_RST(1) of the result matrix.

Figure 21:
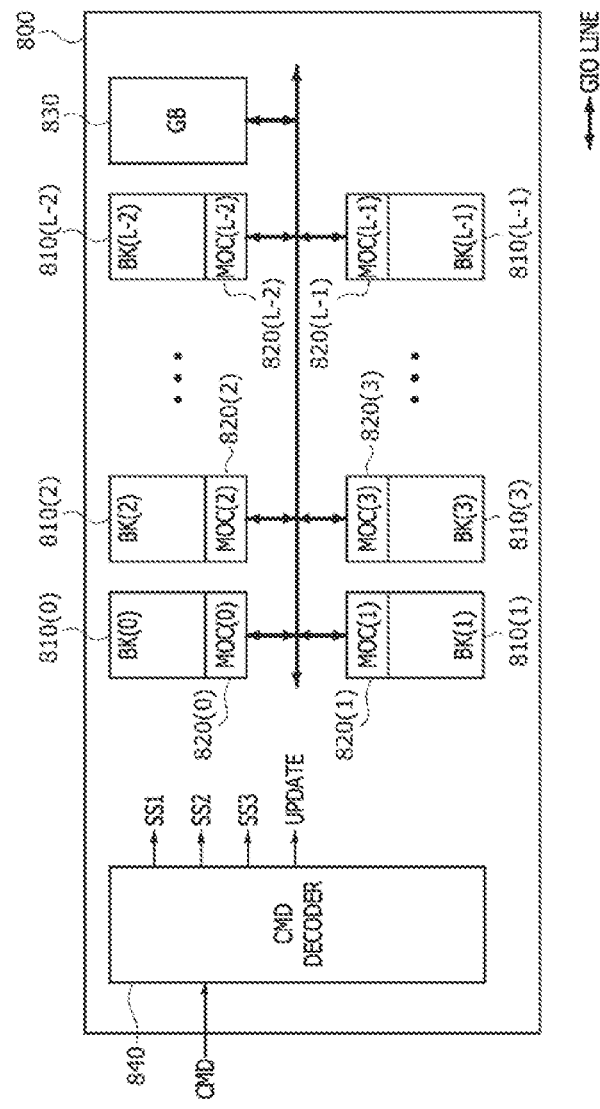
FIG. 21 illustrates a PIM device according to another embodiment of the present disclosure.

FIG. 21 illustrates a PIM device 800 according to another embodiment of the present disclosure. Referring to FIG. 21, the PIM device 800 may include "L"-number of memory banks BK(0)~BK(L−1) (i.e., first to $L^{th}$ memory banks 810(0)~810(L−1)), "L"-number of multiple operation circuits MOC(0)~MOC(L−1) (i.e., first to $L^{th}$ multiple operation circuits 820(0)~820(L−1)), a global buffer (GB) 830, and a command decoder 840 (where, "L" is a natural number which is equal to or greater than two). In the PIM device 800, each of the first to LC multiple operation circuits 820(0)~820(L−1) may have the same configuration as the multiple operation circuit 100 described with reference to FIG. 1. Thus, each of the first to $L^{th}$ multiple operation circuits 820(0)~820(L−1) may selectively perform the MAC operation, the EW multiplying calculation, the EW adding calculation, or the accumulative adding calculation. When each of the first to $L^{th}$ multiple operation circuits 820(0)~820(L−1) performs the MAC operation, each of the first to $L^{th}$ memory banks 810(0)~810(L−1) may constitute one MAC unit with any one of the first to $L^{th}$ multiple operation circuits 820(0)~820(L−1). The multiple operation circuit 820 of a certain MAC unit may receive the weigh data used for the MAC operation from the memory bank of the certain MAC unit. For example, the first memory bank 810(0) and the first multiple operation circuit 820(0) may constitute a first MAC unit. In such a case, the first multiple operation circuit 820(0) may receive the weight data from the first memory bank 810(0). When the PIM device 800 performs the MAC operation, the first to $L^{th}$ multiple operation circuits 820(0)~820(L−1) may perform the MAC operations in the second MAC operation mode described with reference to FIG. 18.

The global buffer 830 may be configured to transmit the vector data used for the MAC operation to the first to $L^{th}$ multiple operation circuits 820(0)~820(L−1). In order that the global buffer 830 transmits the vector data to the first to $L^{th}$ multiple operation circuits 820(0)~820(L−1), the global buffer 830 may receive the vector data from a controller (not shown) to store the vector data therein in response to a request output from a host (not shown). In an embodiment, the global buffer 830 may transmit the vector data to the first to $L^{th}$ multiple operation circuits 820(0)~820(L−1) through a global input/output (I/O) line GIO. The vector data output from the global buffer 830 may be transmitted to each of the first to $L^{th}$ multiple operation circuits 820(0)~820(L−1).

The command decoder 840 may receive a command CMD from an external device, for example, a controller. The command decoder 840 may decode the command CMD to generate and output control signal such as a first selection signal SS1, a second selection signal SS2, a third selection signal SS3, and an update signal UPDATE. Although not shown in FIG. 21, the command decoder 840 may also output additional control signals such as a read signal and a write signal for accessing to the memory banks 810(0)~810(L−1) and the global buffer 830. As described with reference to FIGS. 16 to 18, the first to third selection signals SS1~SS3 and the update signal UPDATE may control a plurality of arithmetic operations or calculations of the multiple operation circuits 820(0)~820(L−1).

Figure 22:
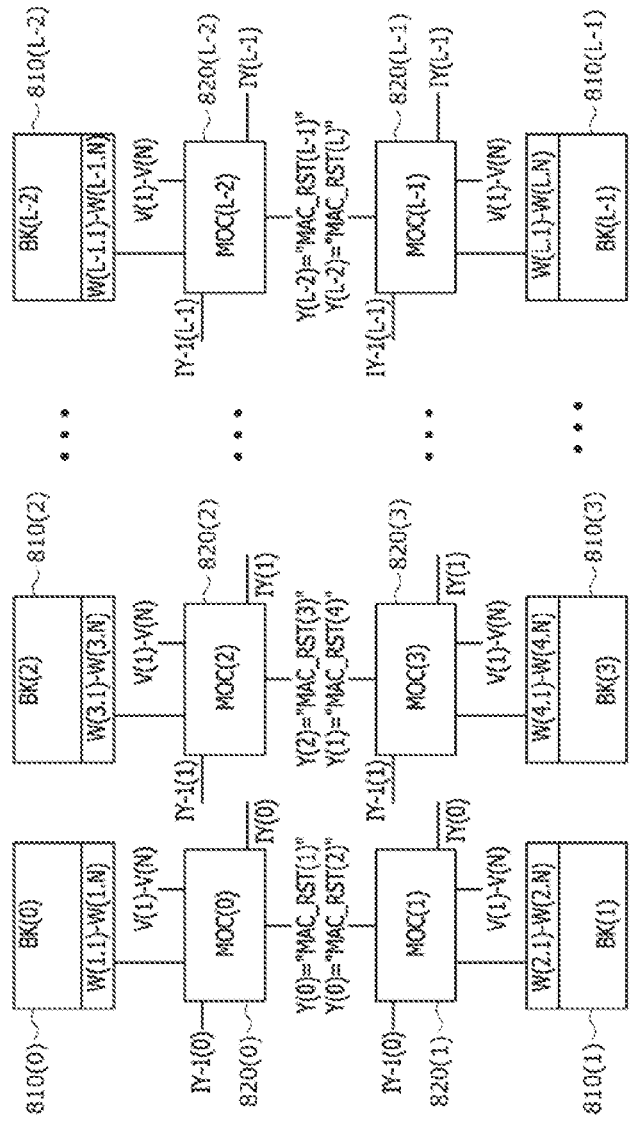
FIG. 22 illustrates an example of a MAC operation performed by the PIM device illustrated in FIG. 21.

FIG. 22 illustrates an example of the MAC operation performed by the PIM device 800 illustrated in FIG. 21. As described with reference to FIG. 21, the multiple operation circuits 820(0)~820(L−1) of the PIM device 800 may perform the MAC operation in the second MAC operation mode which is described with reference to FIG. 18. Referring to FIG. 22, the first multiple operation circuit 820(0) may sequentially receive the weight data W(1.1)~W(1.N) from the first memory bank 810(0) to perform the MAC operation. In addition, the first multiple operation circuit 820(0) may sequentially receive the vector data V(1)~V(N) from the global buffer (830 of FIG. 21).

Specifically, the first multiple operation circuit 820(0) may receive the weight data W(1.1) and the vector data V(1) from respective ones of the first memory bank 810(0) and the global buffer 830 to perform the first MAC operation. Next, the first multiple operation circuit 820(0) may receive the weight data W(1.2) and the vector data V(2) from respective ones of the first memory bank 810(0) and the global buffer 830 to perform the second MAC operation. Subsequently, the first multiple operation circuit 820(0) may receive the weight data W(1.3) and the vector data V(3) from respective ones of the first memory bank 810(0) and the global buffer 830 to perform the third MAC operation. As such, the MAC operation may be iteratively performed until the $N^{th}$ MAC operation for the weight data W(1.N) located at a cross point of the first row and the $N^{th}$ column of the weight matrix and the vector data V(N) in the $N^{th}$ row of the vector matrix is performed. After the $N^{th}$ MAC operation of the first multiple operation circuit 820(0) is performed, the first multiple operation circuit 820(0) may output the first MAC data MAC(1) corresponding to a result of the MAC operation for the weight data W(1.1)~W(1.N) and the vector data V(1)~V(N) as the first MAC result data MAC_RST(1). In the same way, the remaining multiple operation circuits (i.e., the second to $L^{th}$ multiple operation circuits 820(1) ~820(L−1)) may also perform the MAC operations to generate and output the second to $L^{th}$ MAC data MAC(2)~MAC(L) as the second to $L^{th}$ MAC result data MAC_RST(2) ~MAC_RST(L), respectively.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) device comprising:
a first A processing-in-memory (PIM) device comprising:
a plurality of memory banks configured to provide plural groups of weight data;
a global buffer configured to provide plural sets of vector data; and
a plurality of multiplication and accumulation (multiplication/accumulation) (MAC) operators configured to perform MAC operations of the plural groups of weigh data and the plural sets of vector data,
wherein each of the plurality of MAC operators includes a plurality of multiple operation circuits,
wherein each of the plurality of multiple operation circuits is configured to perform an arithmetic operation in a first operation mode, a second operation mode, or a third operation mode according to first to third selection signals, and
wherein each of the plurality of multiple operation circuits includes:
a multiplier configured to perform a multiplying calculation of first input data and second input data to generate and output multiplication result data;
an adder configured to perform an adding calculation of third input data and fourth input data to generate and output addition result data;
a latch circuit configured to latch fifth input data input to an input terminal of the latch circuit to generate and output feedback data; and
a plurality of selectors configured to change transmission paths of a first result data, the first input data, the second input data, the multiplication result data, and the addition result data according to the first operation mode, the second operation mode, or the third operation mode.

2. The PIM device of claim 1,
wherein each group of the plural groups of weight data includes plural sets of weight data;
wherein the plural sets of weight data are input to the plurality of multiple operation circuits, respectively;
wherein the plural sets of vector data are input to the plurality of multiple operation circuits, respectively; and
wherein each of the plurality of multiple operation circuits is configured to receive one set of the plural sets of weight data from one of the plurality of memory banks and one set of the plural sets of vector data from the global buffer, thereby outputting one set of plural sets of operation result data.

3. The PIM device of claim 1,
wherein each of the plurality of multiple operation circuits receives first result data to output second result data; and
wherein the plurality of multiple operation circuits are cascaded in series such that the second result data output from an (i-1)th multiple operation circuit of the plurality of multiple operation circuits correspond to the first result data input to an ith multiple operation circuit of the plurality of multiple operation circuits, and
wherein i is a natural number which is equal to or greater than two.

4. The PIM device of claim 3, wherein the first result data input to a first multiple operation circuit corresponding to a foremost one of the plurality of multiple operation circuits are fixed to have a value of zero.

5. The PIM device of claim 3, wherein the second result data output from a last one of the plurality of multiple operation circuits correspond to result data.

6. A processing-in-memory (PIM) device comprising:
a plurality of memory banks configured to provide plural groups of weight data;
a global buffer configured to provide plural sets of vector data; and
a plurality of multiple operation circuits configured to perform multiplication and accumulation (MAC) operations of the plural groups of weigh data and the plural sets of vector data,
wherein each of the plurality of multiple operation circuits is configured to perform an arithmetic operation in a first operation mode, a second operation mode, or a third operation mode according to first to third selection signals, and
wherein each of the plurality of multiple operation circuits includes:
a multiplier configured to perform a multiplying calculation of first input data and second input data to generate and output multiplication result data;
an adder configured to perform an adding calculation of third input data and fourth input data to generate and output addition result data;
a latch circuit configured to latch fifth input data input to an input terminal of the latch circuit to generate and output feedback data; and
a plurality of selectors configured to change transmission paths of a first result data, the first input data, the second input data, the multiplication result data, and the addition result data according to the first operation mode, the second operation mode, or the third operation mode.

7. The PIM device of claim 6,
wherein the plural groups of weight data are input to the plurality of multiple operation circuits, respectively;
wherein the plural sets of vector data are input to each of the plurality of multiple operation circuits; and wherein each of the plurality of multiple operation circuits is configured to receive one group of the plural groups of weight data from one of the plurality of memory banks and the plural sets of vector data from the global buffer, thereby outputting one set of plural sets of operation result data.

8. The PIM device of claim 7,
wherein the plurality of multiple operation circuits perform a MAC operation corresponding to a matrix-vector multiplying calculation of a weight matrix having first to Mth rows and first to Nth columns and a vector matrix having first to Nth rows and a single column to generate a result matrix having first to Mth rows and a single column, wherein "M" and "N" are natural numbers which are equal to or greater than two; and
wherein each of the plurality of multiple operation circuits is configured to receive the weight data in any one of the first to Mth rows of the weight matrix and the vector data in the single column of the vector matrix to generate and output one of first to Mth MAC result data arrayed in the single column of the result matrix.

9. The PIM device of claim 8, wherein the plurality of multiple operation circuits perform the MAC operation in the second MAC operation mode using the plural groups of the weigh data arrayed in the first to Mth rows of the weight matrix and the vector data arrayed in the single column of the vector matrix as input data to generate first to Mth MAC result data located in respective ones of the first to Mth rows of the result matrix.

10. The PIM device of claim 9, wherein each of the plurality of multiple operation circuits is configured to iteratively perform the MAC operation for "N" sets of the weight data in one row of the weight matrix and "N" sets of the vector data in the single column of the vector matrix "N" times.

11. The PIM device of claim 10, wherein each of the plurality of multiple operation circuits outputs the MAC result data, which are generated by the MAC operation performed using the Nth set of weight data and the Nth set of vector data as input data, as the operation result data.

* * * * *